US012138935B2

(12) United States Patent
Nagashima et al.

(10) Patent No.: US 12,138,935 B2
(45) Date of Patent: Nov. 12, 2024

(54) BOTTLE SET AND BOTTLE

(71) Applicant: SEIKO EPSON CORPORATION, Tokyo (JP)

(72) Inventors: Takumi Nagashima, Matsumoto (JP); Hitoshi Igarashi, Shiojiri (JP); Ryoichi Tanaka, Shiojiri (JP); Tadahiro Mizutani, Shiojiri (JP); Tomoyuki Nakano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/199,632

(22) Filed: May 19, 2023

(65) Prior Publication Data

US 2023/0286283 A1 Sep. 14, 2023

Related U.S. Application Data

(63) Continuation of application No. 16/708,934, filed on Dec. 10, 2019, now Pat. No. 11,691,428, which is a (Continued)

(30) Foreign Application Priority Data

Sep. 2, 2016 (JP) ................................ 2016-171536

(51) Int. Cl.
*B41J 2/17* (2006.01)
*B41J 2/175* (2006.01)
(Continued)

(52) U.S. Cl.
CPC ....... *B41J 2/17536* (2013.01); *B41J 2/17509* (2013.01); *B41J 2/17523* (2013.01); (Continued)

(58) Field of Classification Search
None
See application file for complete search history.

(56) References Cited

U.S. PATENT DOCUMENTS 3,907,145 A 9/1975 Horvath
5,040,691 A 8/1991 Hayes et al.
(Continued)

FOREIGN PATENT DOCUMENTS

JP S55-021984 Y2 5/1980
JP 2008-515737 A 5/2008
(Continued)

OTHER PUBLICATIONS http://www.livelovediy.com/2013/05/10-painting-tips-tricks-you-never-knew.html (Year: 2013).
(Continued)

*Primary Examiner* — Erica S Lin
(74) *Attorney, Agent, or Firm* — Oliff PLC

(57) ABSTRACT

When a known lid member was merely applied to a bottle that contains ink, there was room for improvement in terms of the operation of the lid member and the way how to bring attention to the handling thereof.

A bottle set is provided that includes: a bottle that includes an ink container that contains ink, and an outflow port through which the ink in the ink container flows out to the outside; and a lid member that is configured to attach to and detach from the bottle, and is configured to cover the outflow port in a state of being attached to the bottle. The lid member includes a colored portion that has optical transparency and is colored with a color corresponding to a type of the ink contained in the ink container in at least a portion of the lid member.

7 Claims, 14 Drawing Sheets

Related U.S. Application Data continuation of application No. 15/692,923, filed on Aug. 31, 2017, now Pat. No. 10,538,093.

(51) Int. Cl.

| | |
|---|---|
| ***B65D 25/48*** | (2006.01) |
| ***B65D 41/04*** | (2006.01) |
| ***B65D 43/02*** | (2006.01) |
| ***B65D 47/12*** | (2006.01) |
| ***B65D 51/18*** | (2006.01) |
| ***B65D 51/24*** | (2006.01) |

(52) U.S. Cl.

CPC .......... *B41J 2/17553* (2013.01); *B65D 25/48* (2013.01); *B65D 41/04* (2013.01); *B65D 43/02* (2013.01); *B65D 47/12* (2013.01); *B65D 47/123* (2013.01); *B65D 51/18* (2013.01); *B65D 51/245* (2013.01); *B65D 2251/0015* (2013.01); *B65D 2251/0018* (2013.01); *B65D 2251/0025* (2013.01); *B65D 2251/0028* (2013.01); *B65D 2251/0046* (2013.01); *B65D 2251/0056* (2013.01); *B65D 2251/0059* (2013.01); *B65D 2251/0093* (2013.01)

(56) References Cited

U.S. PATENT DOCUMENTS

| | | | | |
|---|---|---|---|---|
| 5,307,954 | A | 5/1994 | Gick et al. | |
| 5,920,333 | A | 7/1999 | Bates | |
| 6,202,869 | B1 | 3/2001 | Sullivan | |
| 6,513,892 | B2 | 2/2003 | Inoue et al. | |
| 2004/0068900 | A1 | 4/2004 | Moran | |
| 2005/0011916 | A1 * | 1/2005 | Battista | B41J 2/17523 222/576 |
| 2005/0169696 | A1 | 8/2005 | Albisetti | |
| 2006/0076370 | A1 | 4/2006 | Etesse | |
| 2006/0187280 | A1 | 8/2006 | Yan | |
| 2007/0051691 | A1 * | 3/2007 | Hidding | B65D 51/20 220/258.1 |
| 2009/0026104 | A1 | 1/2009 | Cassidy | |
| 2012/0125481 | A1 | 5/2012 | Matsumoto et al. | |
| 2012/0219469 | A1 | 8/2012 | Tseung et al. | |
| 2012/0287209 | A1 | 11/2012 | Yan | |
| 2014/0144868 | A1 * | 5/2014 | Besson | B65D 23/14 215/230 |
| 2016/0121619 | A1 | 5/2016 | Tomoguchi | |
| 2018/0037381 | A1 | 2/2018 | White et al. | |
| 2018/0329892 | A1 | 11/2018 | Lubbers et al. | |

FOREIGN PATENT DOCUMENTS

| | | |
|---|---|---|
| JP | 2013-006320 A | 1/2013 |
| JP | 2015-128998 A | 7/2015 |

OTHER PUBLICATIONS https ://missmaryli berry.com/2011 / 11 /04/flannel-friday-an-alleged-puffy-paint-master-lets-you-i n-on-her-secrets/ (Year: 2011).

* cited by examiner

BOTTLE SET AND BOTTLE

CROSS REFERENCE TO RELATED APPLICATION

This application is a continuation of U.S. patent application Ser. No. 16/708,934 filed Dec. 10, 2019, which is a continuation of U.S. patent application Ser. No. 15/692,923 filed Aug. 31, 2017, which claims priority to Japanese Patent Application No. 2016-171536 filed on Sep. 2,2016 the entire contents of this application are incorporated by reference herein.

BACKGROUND

1. Technical Field

The present invention relates to a bottle set, a bottle, and the like.

2. Related Art

Heretofore, a transparent cap is known (refer to JP-A-2015-128998, for example) as a cap (lid member) that is attachable to and detachable from a container body that contains liquid such as a liquid detergent. With this transparent cap, the content poured into the cap can be visually confirmed.

The cap described in JP-A-2015-128998 can be applied to a bottle for another application. It is conceivable to apply a transparent cap that is not colored to a bottle for containing ink, for example. An inkjet printer is known that is capable of printing on a recording medium, such as recording paper, using ink by discharging the ink from a recording head onto the recording medium. Some inkjet printers allow a user to refill a tank for storing ink that is supplied to the recording head. When ink is injected into the tank, a bottle (ink bottle) that contains ink can be used. The aforementioned transparent cap can be applied to a bottle that contains ink.

Various types of ink are used in an inkjet printer. For example, colors of ink include yellow, magenta, cyan, and black. In this case, four bottles are provided corresponding to the colors of ink. When the aforementioned transparent caps are applied to a plurality of bottles for different types of ink, it is difficult to identify the caps for the different types of ink, for example. In this case, it is conceivable that the caps may be mistakenly attached to bottles for different types of ink, and the like. Therefore, when a known lid member was merely applied to a bottle that contains ink, there was room for improvement in terms of operating the lid member and binging attention to the handling thereof.

SUMMARY

The invention can solve at least one of the above problems, and may be realized as the following modes or application examples.

Application Example 1

A bottle set including: a bottle that includes an ink container that contains ink to be ejected in an ink ejection apparatus, and an outflow port through which the ink in the ink container flows out to the outside; and a lid member that is configured to attach to and detach from the bottle, and is configured to cover the outflow port in a state of being attached to the bottle. The lid member includes a colored portion that has optical transparency and is colored with a color corresponding to a type of the ink contained in the ink container in at least a portion of the lid member.

With this bottle set, as a result of providing a portion that is colored with a color corresponding to the type of ink, the lid member can be easily identified with respect to the type of ink. Therefore, attention can be brought to operation of the lid member when attaching/detaching the lid member to/from the bottle, or the like. Accordingly, it is easy to prevent the lid member from being attached to a wrong bottle of a different type of ink, for example.

Application Example 2

The bottle set described above, wherein the type of the ink is classified by the color of the ink.

With this bottle set, as a result of providing a lid member having a portion colored with a color that is different depending on the color of ink, the lid member can be easily identified with respect to the color of ink. Therefore, attention can be brought to operation of the lid member when attaching/detaching the lid member to/from the bottle, or the like. Accordingly, if the lid member has a portion that is colored with a color similar to the ink color, the lid member can be prevented from being attached to a wrong bottle of a different type of ink, for example.

Application Example 3

The bottle set described above, wherein the colored portion of the lid member is colored with a color similar to the color of the ink.

In this bottle set, as a result of providing a lid member having a portion colored with a color similar to the color of ink, the lid member can be prevented from being mistakenly attached.

Application Example 4

The bottle set described above, wherein the colored portion of the lid member is colored with a color opposite to the color of the ink.

In this bottle set, as a result of providing a lid member having a portion colored with a color opposite to the color of ink, the ink adhered to the lid member can be easily recognized, for example. Therefore, adhesion of ink to the lid member can be easily noticed. Accordingly, attention can be brought to the scattering of ink adhered to the lid member when the lid member is operated so as to attach/detach the lid member to/from the bottle, or the like.

Application Example 5

The bottle set described above, wherein the outflow port is located at one end of the bottle, the lid member includes a top plate that is to oppose the outflow port, and a tubular barrel that projects from the top plate toward the ink container side, and the colored portion colored with a color similar to the color of the ink is arranged on the top plate side of the barrel.

In this bottle set, a portion colored with a color similar to the color of the ink is arranged in a region on the top plate side of the barrel of the lid member. Accordingly, the lid member can be prevented from being mistakenly attached, and the ink adhered to a portion near the outflow port to which ink is likely to adhere becomes inconspicuous.

Application Example 6

The bottle set described above, wherein the outflow port is located at one end of the bottle, the lid member includes a top plate that is to oppose the outflow port, and a tubular barrel that projects from the top plate toward the ink container side, and the colored portion colored with a color opposite to the color of the ink is arranged on the side of the barrel opposite to the top plate side.

In this bottle set, a portion colored with a color opposite to the color of the ink is arranged in a region on the end side of the barrel of the lid member. Accordingly, when the ink adhered to the lid member is located on the end side of the barrel, attention can be brought to a situation in which the ink is likely to drip from the lid member.

Application Example 7

The bottle set described above, wherein the outflow port is located at one end of the bottle, the lid member includes a top plate that is to oppose the outflow port, and a tubular barrel that projects from the top plate toward the ink container side, the colored portion is arranged in each of a first region that includes the top plate and is a region from the top plate to a position on the top plate side relative to an end on a side of the barrel opposite to the top plate side, and a second region that is located on the end side of the barrel relative to the first region, the colored portion, of the colored portions, that is arranged in the first region is a first colored portion, and the colored portion arranged in the second region is a second colored portion, the first colored portion is colored with a color similar to the color of the ink, and the second colored portion is colored with a color opposite to the color of the ink.

In this bottle set, a portion colored with a color similar to the color of the ink is arranged in the first region on the top plate side of the lid member, and a portion colored with a color opposite to the color of the ink is arranged in the second region on the end side of the lid member relative to the first region. Accordingly, the first region can be made closer to the outflow port to which ink is likely to adhere, and the second region can be made closer to the end of the barrel. Therefore, as a result of providing the portion colored with a color similar to the color of the ink, the ink adhered to a portion near the outflow port of the nozzle becomes inconspicuous. Also, as a result of providing the portion colored with a color opposite to the color of the ink, the ink adhered to a portion of the barrel on the end side can be easily recognized, for example. Accordingly, attention can be brought to a situation in which the ink is likely to drip from the lid member.

Application Example 8

A bottle that contains ink to be ejected in an ink ejection apparatus, the bottle including: an ink container that contains ink; a container member in which an opening that is in communication with the inside of the ink container is formed; a nozzle member in which an outflow port that is in communication with the opening is formed, that is attached to the container member being configured to attach to and detach from the container member, and through which the ink flows out; and a film that seals the opening by covering the opening of the container member, and extends outside the nozzle member in a state in which the nozzle member is attached to the container member.

In this bottle, since the film that seals the opening extends outside the nozzle member, the user can easily notice the presence of the film. Therefore, the user is prompted to peel off the film from the container member in the bottle.

Application Example 9

The bottle described above, wherein a label indicating information is added to a portion, of the film, that extends outside the nozzle member.

In this bottle, since a label is added to a portion, of the film, that extends outside the nozzle member, the user can be easily notified of information.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
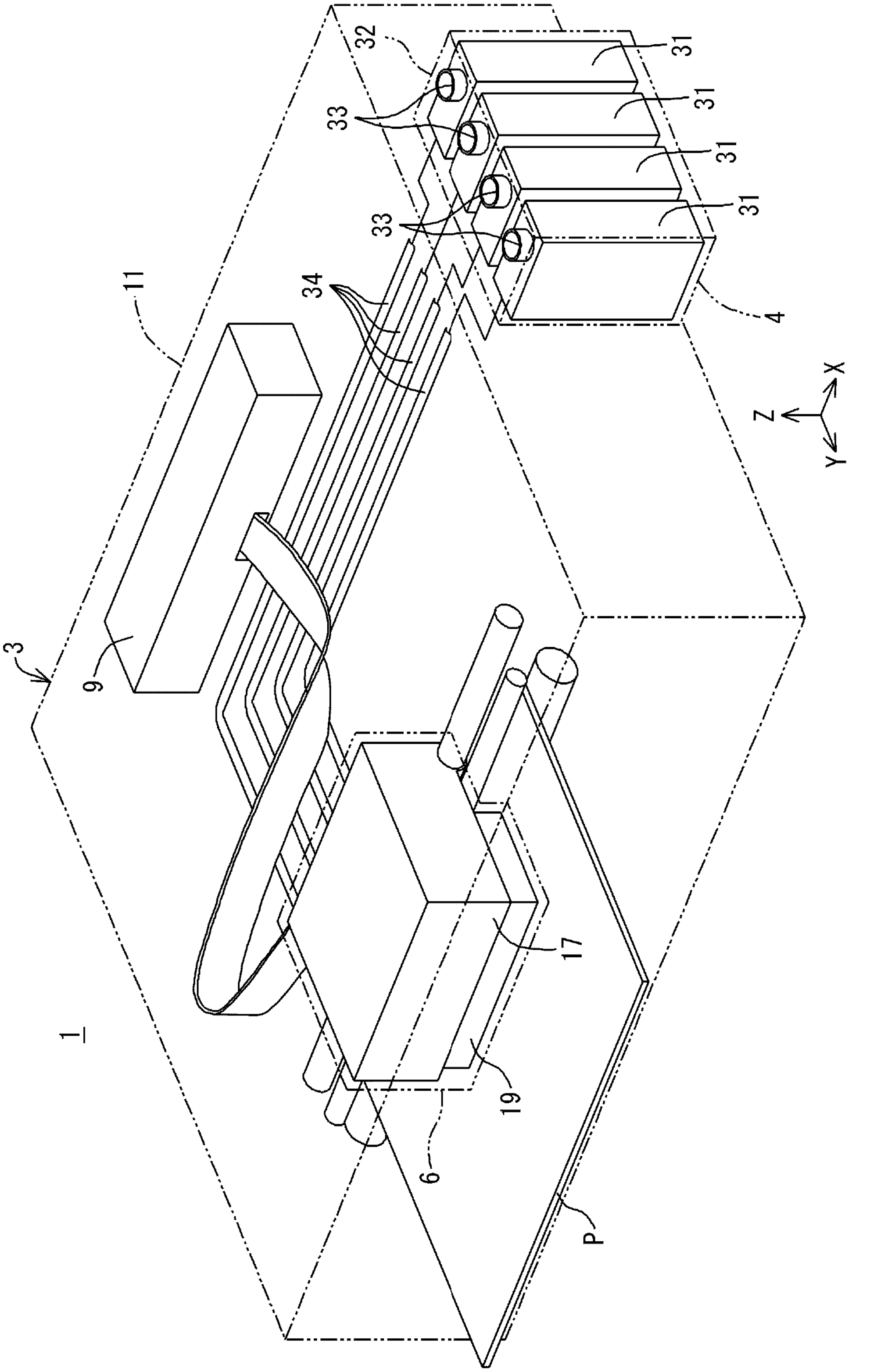
FIG. 1 is a perspective view schematically showing a main configuration of an ink ejection system according to an embodiment.

An embodiment will be described while taking an ink ejection system and a bottle set as an example, with reference to the drawings. Note that, in the drawings, the scale of constituent parts and members may be different such that the respective constituent parts are shown with a recognizable size.

As shown in FIG. 1, an ink ejection system 1 according to this embodiment includes a printer 3, which is an example of an ink ejection apparatus, and an ink supply apparatus 4. The printer 3 has a recorder 6 and a controller 9. Note that X, Y, and Z axes, which are orthogonal coordinate axes, are provided in FIG. 1. The X, Y, and Z axes are also provided as required in the subsequent drawings. In this case, the X, Y, and Z axes in each diagram correspond respectively to the X, Y, and Z axes in FIG. 1. FIG. 1 shows a state where the ink ejection system 1 is disposed on an XY plane defined by the X axis and the Y axis. In this embodiment, the state where the ink ejection system 1 is disposed on the XY plane with the XY plane being matched to a horizontal plane is a use state of the ink ejection system 1. The posture of the ink ejection system 1 when the ink ejection system 1 is disposed on the XY plane that is matched to a horizontal plane will be called a use posture of the ink ejection system 1.

Note that the horizontal plane may be a substantially horizontal plane. The substantially horizontal plane includes a plane that is inclined in an allowable inclination range relative to a surface on which the ink ejection system 1 is placed when in use, for example. Accordingly, the substantially horizontal plane is not limited to a plane such as that of a surface plate that has been highly accurately formed, for example. The substantially horizontal plane includes various planes such as those of a desk, a stand, a rack, and a floor on which the ink ejection system 1 is placed when in use. Also, the vertical direction is not limited to a direction strictly along a gravity direction, and includes a perpendicular direction relative to a substantially horizontal plane as well. Therefore, when the substantially horizontal plane is a plane such as that of a desk, a stand, a rack, and a floor, for example, the vertical direction indicates a direction perpendicular to such a plane.

Hereinafter, the X axis, Y axis, and Z axis that appear in the drawings and descriptions depicting constituent parts and units of the ink ejection system 1 mean the X axis, Y axis, and Z axis in a state where the constituent parts and units are assembled with (mounted in) the ink ejection system 1. The posture of the constituent parts and units when the ink ejection system 1 is in the use state will be called a use posture of these constituent parts and units. In the following description, the ink ejection system 1, the constituent parts and units thereof, and the like in their use posture will be described unless otherwise stated.

The Z axis is an axis perpendicular to the XY plane. When the ink ejection system 1 is in the use state, the Z-axis direction is a vertically upward direction. Also, when the ink ejection system 1 is in the use state, the -Z-axis direction is a vertically downward direction in FIG. 1. Note that, regarding the X, Y, and Z axes, the arrow orientation indicates a plus (positive) direction, and the orientation opposite to the arrow orientation indicates a minus (negative) direction. Note that the vertically upward direction and vertically upward indicate an upward direction and upward along a vertical line. Similarly, the vertically downward direction and vertically downward indicate a downward direction and downward along a vertical line. The upward direction and upward without mentioning "vertically" are not limited to an upward direction and upward along a vertical line, and include an upward direction and upward along a direction that intersects the vertical line except for the horizontal direction. Also, the downward direction and downward without mentioning "vertically" are not limited to a downward direction and downward along a vertical line, and include a downward direction and downward along a direction that intersects the vertical line except for the horizontal direction.

In the printer 3, the recorder 6 and the controller 9 are housed in the housing 11. The recorder 6 performs recording using ink, which is an example of a liquid, on a recording medium P, which is conveyed in the Y-axis direction by a conveying apparatus (not shown). Note that the conveying apparatus (not shown) intermittently conveys the recording medium P, such as recording paper, in the Y-axis direction. The recorder 6 is configured to be able to be moved back and forth along the X axis by a moving apparatus (not shown). An ink supply apparatus 4 supplies the ink to the recorder 6. The controller 9 controls driving of the aforementioned constituent parts.

Here, a direction parallel with the X axis is not limited to a direction that is perfectly parallel with the X axis, and also includes a direction that tilts relative to the X axis due to an error, a tolerance, or the like, excluding a direction perpendicular to the X axis. Similarly, a direction parallel with the Y axis is not limited to a direction that is perfectly parallel with the Y axis, and also includes a direction that tilts relative to the Y axis due to an error, a tolerance, or the like, excluding a direction perpendicular to the Y axis. A direction parallel with the Z axis is not limited to a direction that is perfectly parallel with the Z axis, and also includes a direction that tilts relative to the Z axis due to an error, a tolerance, or the like, excluding a direction perpendicular to the Z axis. That is to say, a direction parallel to an axis or a plane is not limited to a direction that is perfectly parallel with this axis or plane, and also includes a direction that tilts relative to this axis or plane due to an error, a tolerance, or the like, excluding a direction perpendicular to this axis or plane.

The recorder 6 includes a carriage 17 and a recording head 19. The recording head 19 is an example of an ink ejector, and discharges droplets of the ink to perform recording on the recording medium P. The recording head 19 is mounted in the carriage 17. Note that the recording head 19 is electrically connected to the controller 9. Discharge of ink droplets from the recording head 19 is controlled by the controller 9.

The ink supply apparatus 4 includes tanks 31, as shown in FIG. 1. In this embodiment, the ink supply apparatus 4 has a plurality of (in this embodiment, four) tanks 31. The plurality of tanks 31 are housed in a housing 32. Thus, the tanks 31 can be protected by the housing 32. Note that the housing 32 and the housing 11 may be separate bodies, or may be integrated. In the case where the housing 32 and the housing 11 are integrated, it can be said that the plurality of tanks 31 are housed in the housing 11 together with the recording head 19 and ink supply tubes 34.

The ink is contained in each tank 31. An ink injection portion 33 is formed in each tank 31. The ink can be injected into each tank 31 from outside via the ink injection portion 33. Note that an operator can access the ink injection portion 33 of the tank 31 from outside the housing 32. The ink injection portion 33 is sealed by a lid (not shown). When the ink is injected into each tank 31, a lid is removed to open the ink injection portion 33, and thereafter the ink is injected.

Ink supply tubes 34 are connected to the respective tanks 31. The ink in each tank 31 is supplied to the recording head 19 from the ink supply apparatus 4 via the corresponding ink supply tube 34. The ink supplied to the recording head 19 is discharged as ink droplets from nozzles (not shown), which are oriented toward the recording medium P side. Note that, although the above example describes the printer 3 and the ink supply apparatus 4 as separate constituent parts, the ink supply apparatus 4 may be included in the constituent parts of the printer 3.

In the ink ejection system 1 having the above configuration, recording is performed onto the recording medium P by conveying the recording medium P in the Y-axis direction, and causing the recording head 19 to discharge ink droplets at a given position while moving the carriage 17 back and forth along the X axis. This operation is controlled by the controller 9.

The ink is not limited to either one of water-based ink or oil-based ink. Water-based ink may be either ink having a configuration in which a solute, such as a dye, is dissolved in a water-based solvent, or ink having a configuration in which a dispersoid, such as a pigment, is dispersed in a water-based dispersing medium. Oil-based ink may be either ink having a configuration in which a solute, such as a dye, is dissolved in an oil-based solvent, or ink having a configuration in which a dispersoid, such as a pigment, is dispersed in an oil-based dispersing medium.

In this embodiment, a bottle set may be utilized to inject ink into the tanks 31. Hereinafter, various examples of the bottle set will be described.

EXAMPLE 1

Figure 2:
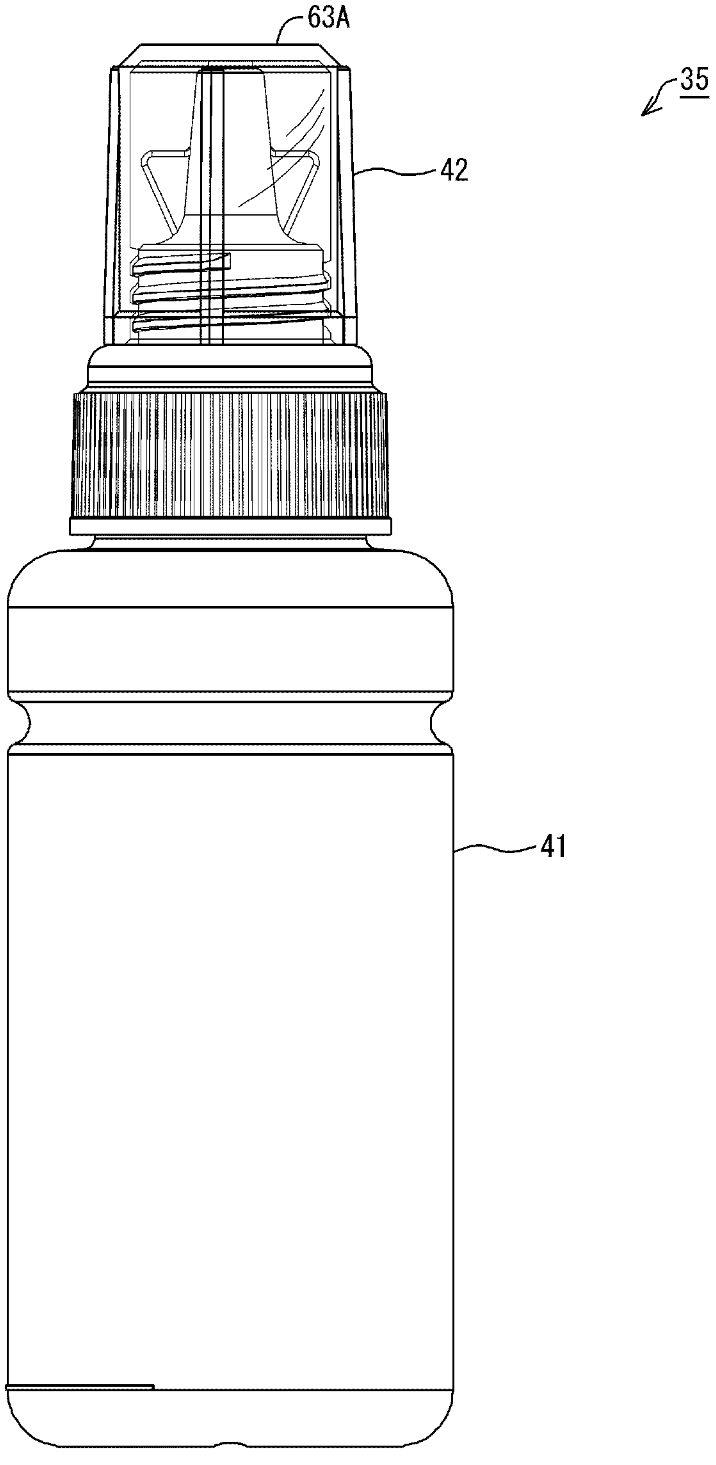
FIG. 2 is an external view of a bottle set according to an embodiment.
Figure 3:
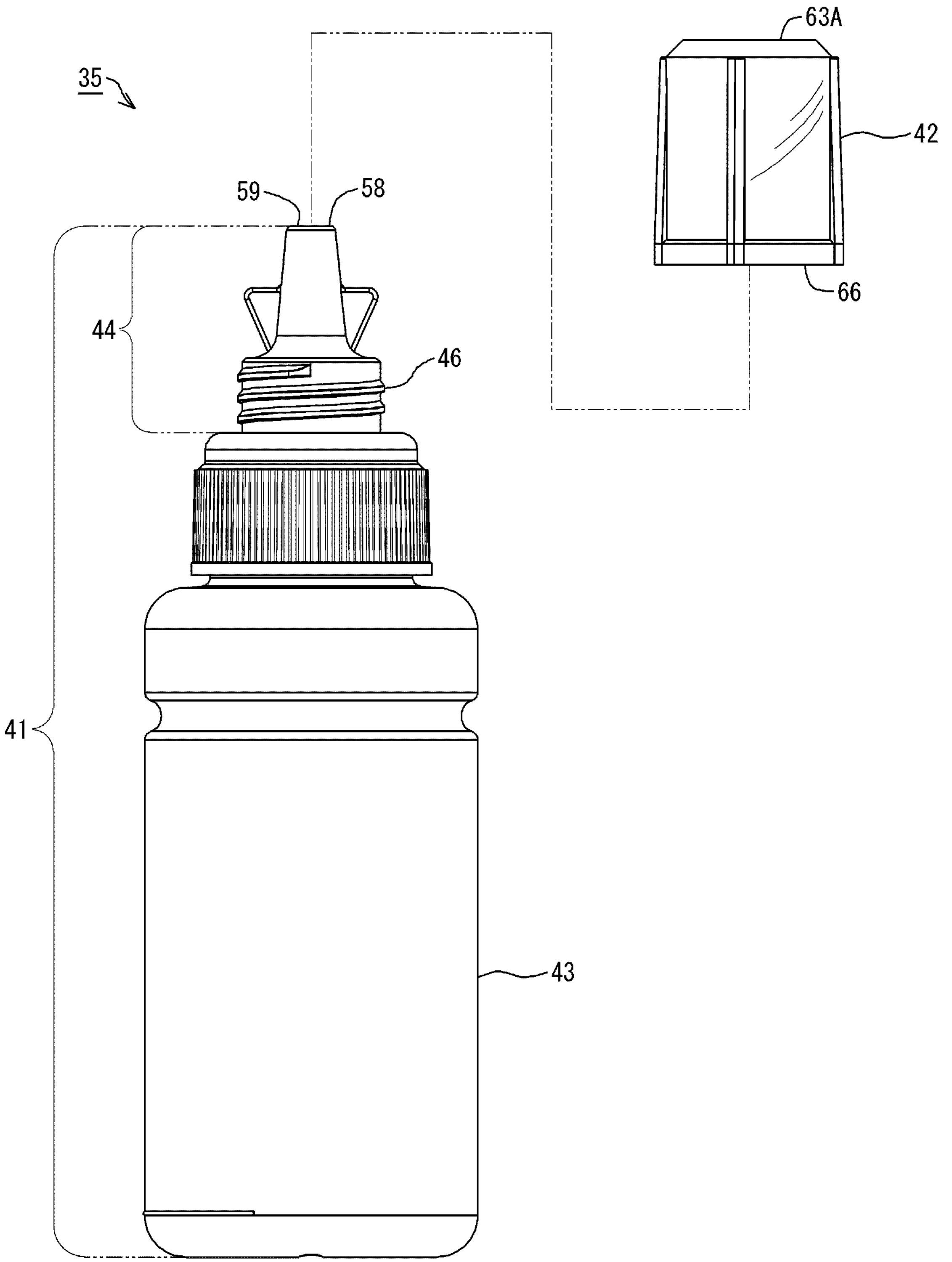
FIG. 3 is an exploded view of the bottle set according to an embodiment.

A bottle set of Example 1 will be described. A bottle set 35 of Example 1 shown in FIG. 2 may be utilized to inject ink into the tanks 31. The bottle set 35 of Example 1 contains ink to be injected into a tank 31. The bottle set 35 includes a bottle 41 and a lid member 42. The lid member 42 is made of a material having optical transparency. The lid member 42 is configured to be attachable to and detachable from the bottle 41, as shown in FIG. 3. The bottle 41 includes an ink container 43 and a nozzle 44. The ink container 43 is a portion that is capable of containing ink. The nozzle 44 is a portion through which the ink in the ink container 43 can flow out of the bottle 41.

The lid member 42, when in a state of being attached to the bottle 41, is configured to be able to cover the nozzle 44. The nozzle 44 can also be defined as a portion that is covered by the lid member 42 when the lid member 42 is attached to the bottle 41. A later-described outflow port 59 is formed in the nozzle 44. The ink in the ink container 43 flows out of the bottle 41 from the outflow port 59 of the nozzle 44. The lid member 42, when in a state of being attached to the bottle 41, covers the outflow port 59 of the nozzle 44. Note that, in the bottle set 35, the state in which the lid member 42 is attached to the bottle 41 (FIG. 2) is referred to as a covered state. The covered state is a state in which the lid member 42 is attached to the bottle 41, and the outflow port 59 is covered by the lid member 42.

Note that the lid member 42 may be engaged with the nozzle 44 via a thread 46 formed on the nozzle 44, as shown in FIG. 3. That is to say, in this embodiment, the lid member 42 is configured to be able to be attached to the bottle 41 through engagement therebetween via the thread 46. Note that the lid member 42 has a later-described thread, which is formed to be capable of engaging with the thread 46 on the nozzle 44. As a result of the thread in the lid member 42 engaging with the thread 46 on the nozzle 44, the lid member 42 may be attached to the bottle 41.

Figure 4:
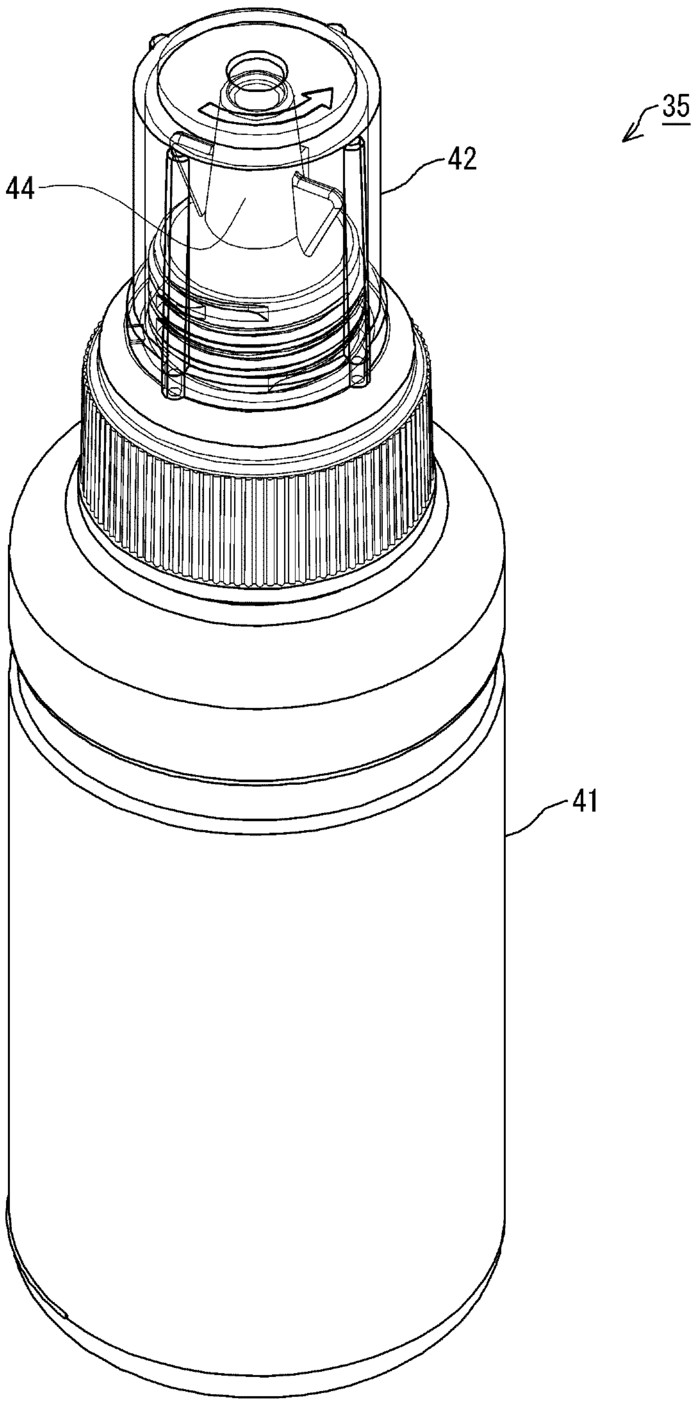
FIG. 4 is a perspective view of the bottle set according to an embodiment.

As described above, the lid member 42 is made of a material having optical transparency. Therefore, in the bottle set 35, at least a portion of the nozzle 44 can be visually recognized through the lid member 42, as shown in FIG. 4. Optical transparency is a property according to which at least a portion of visible light can pass. Due to being optically transparent, at least a portion of the nozzle 44 can be visually confirmed. Note that, in the example shown in FIG. 4, all lid members 42 have optical transparency. Accordingly, the nozzle 44 can be visually confirmed through the lid member 42.

Figure 5:
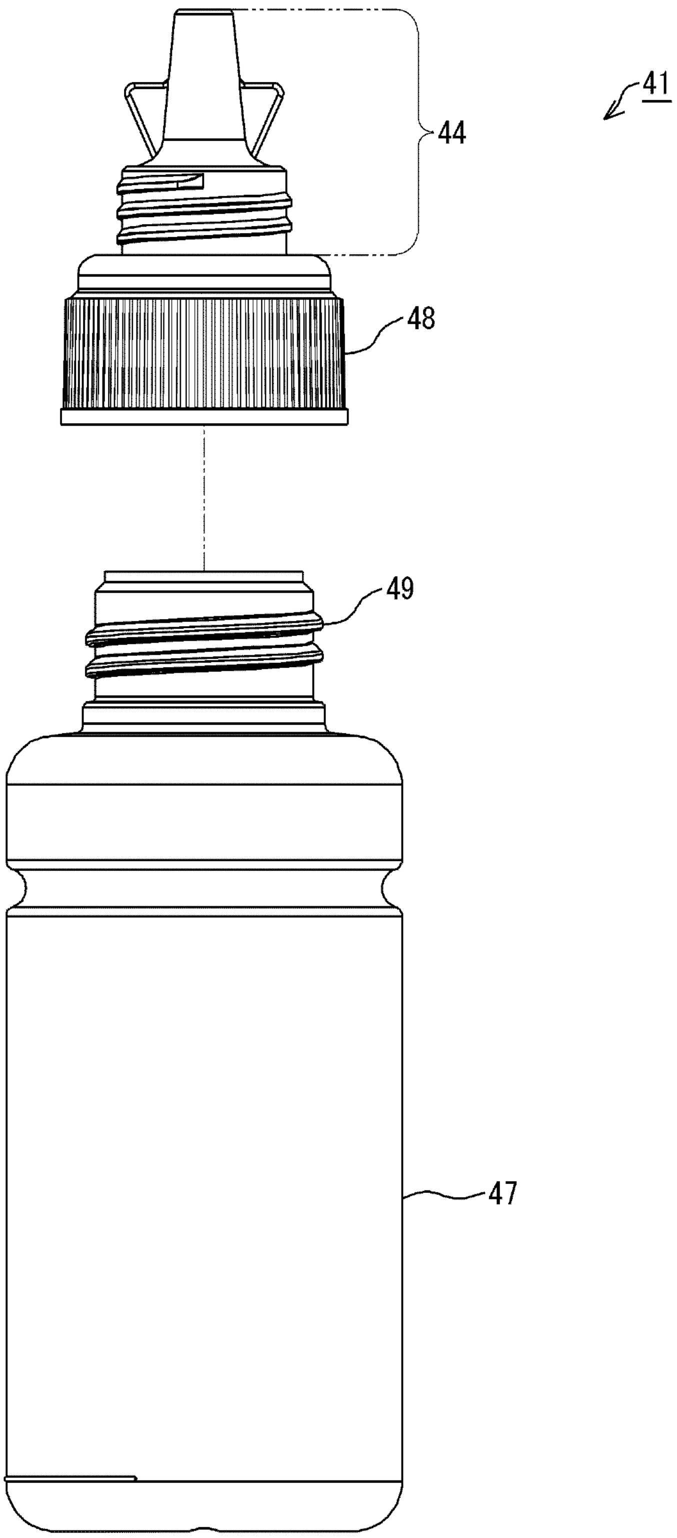
FIG. 5 is an exploded view of a bottle according to an embodiment.

In this embodiment, the bottle 41 includes a container member 47 and a nozzle member 48, as shown in FIG. 5. In this embodiment, the bottle 41 is configured by integrally combining the container member 47 with the nozzle member 48 to form one body, the body having cylindrical side wall 47*a*. The container member 47 and the nozzle member 48 are combined to form one bottle 41 through engagement therebetween via a thread 49.

Note that the nozzle member 48 has a later-described thread, which is formed to be capable of engaging with the thread 49 on the container member 47. As a result of the thread in the nozzle member 48 engaging with the thread 49 on the container member 47, the container member 47 and the nozzle member 48 are combined to form one bottle 41.

Note that the number of parts to constitute the bottle 41 is not limited to two, namely the container member 47 and the nozzle member 48. The number of parts to constitute the bottle 41 may be three or more. Also, the number of parts to constitute the bottle 41 may be one. When the bottle 41 is constituted by one part, this part can be formed by integrally molding resin, for example.

Figure 6:
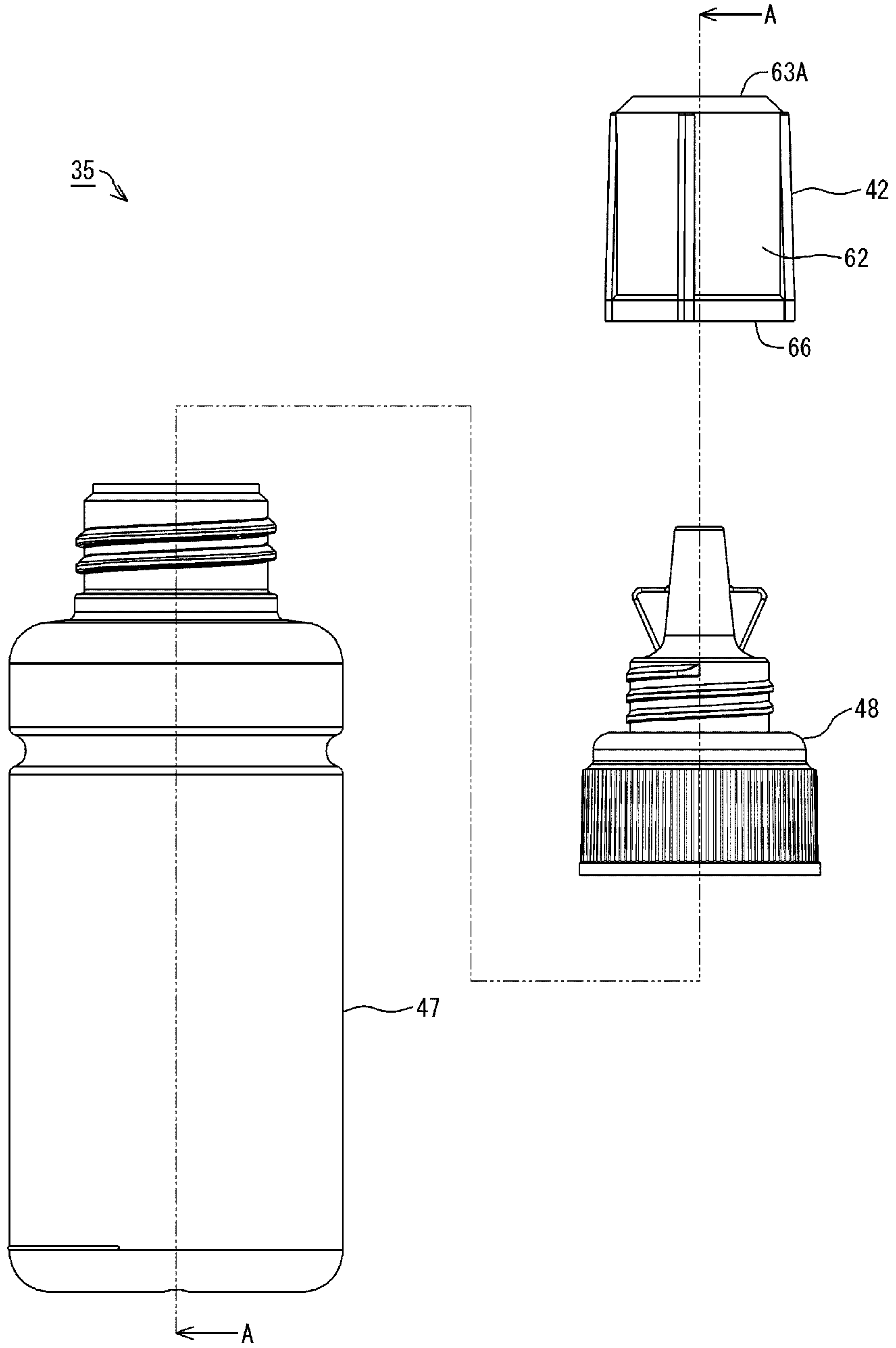
FIG. 6 is an exploded view of the bottle set according to an embodiment.
Figure 7:
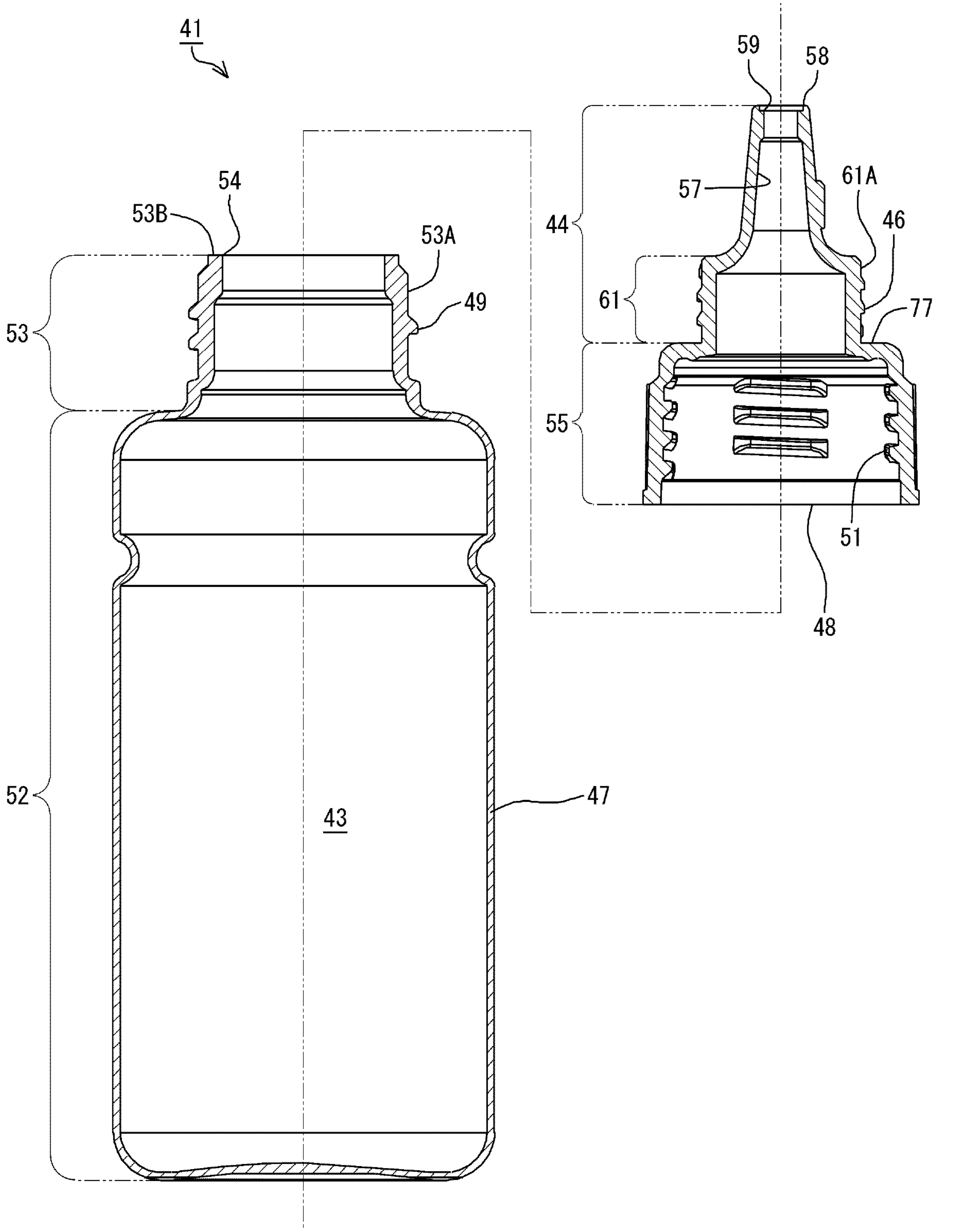
FIG. 7 is a cross-sectional view of the bottle according to an embodiment.

A bottle set 35 in Example 1 includes a container member 47, a nozzle member 48, and a lid member 42, as shown in FIG. 6. In the bottle set 35, the container member 47 and the nozzle member 48 constitute the bottle 41, as shown in FIG. 7. Note that FIG. 7 shows a cross-section of the bottle 41 in Example 1 taken along a line A-A in FIG. 6.

The container member 47 is configured to be able to contain ink. The container member 47 and the nozzle member 48 are configured to be separate bodies. A thread 51 is formed in the nozzle member 48. The container member 47 and the nozzle member 48 are configured to be engageable with each other using the thread 49 on the container member 47 and the thread 51 in the nozzle member 48. The container member 47 and the nozzle member 48 are also configured to be attachable to and detachable from each other. By relatively twisting (turning) the nozzle member 48 with respect to the container member 47, the nozzle member 48 can be removed from the container member 47.

The ink is contained in the container member 47. The container member 47 is made of an elastic material. As shown in FIG. 7, the container member 47 has a tubular barrel 52, a tubular engaging portion 53, and an opening 54. The material of the container member 47 may be resin such as polyethylene terephthalate (PET), nylon, polyethylene, polypropylene, or polystyrene, for example. The barrel 52 and the engaging portion 53 are integrally formed. The barrel 52 is located on the side opposite to the nozzle member 48 side with respect to the engaging portion 53. The engaging portion 53 is located on the nozzle member 48 side with respect to the barrel 52. The engaging portion 53 is formed to have a smaller diameter than that of the barrel 52. The thread 49 is formed in an outer side portion 53A of the engaging portion 53. The thread 49 is provided so as to project from the side portion 53A. The opening 54 is formed at an end 53B of the engaging portion 53 on the side opposite to the barrel 52 side. The opening 54 is open toward the nozzle member 48 side.

According to the above configuration, the container member 47 is formed having a hollow container shape with a barrel 52 and an engaging portion 53. The bottle 41 can contain ink of an amount corresponding to the barrel 52 and the engaging portion 53. In the bottle 41, the ink container 43 is constituted by an internal space formed by the barrel 52 and the engaging portion 53 of the container member 47.

The nozzle member 48 may be divided into a joint portion 55 and the nozzle 44, as shown in FIG. 7. The joint portion 55 and the nozzle 44 are integrally formed. The material of the nozzle member 48 may be resin such as polyethylene terephthalate (PET), nylon, polyethylene, polypropylene, or polystyrene, for example. The joint portion 55 has a tubular appearance. The thread 51 is provided in an inner side face of the joint portion 55. The joint portion 55 is a part to be engaged with the container member 47 using the thread 51. The inner diameter of the joint portion 55 is configured to be wider than the outer diameter of the engaging portion 53 of the container member 47. The thread 51 is formed inside the joint portion 55, and the thread 49 is formed outside the engaging portion 53 of the container member 47. As a result of the thread 51 provided inside the joint portion 55 engaging with the thread 49 provided outside the engaging portion 53, the nozzle member 48 and the container member 47 engage with each other. In a state where the nozzle member 48 and the container member 47 engage with each other, the joint portion 55 of the nozzle member 48 covers the engaging portion 53 of the container member 47.

The nozzle 44 projects from the joint portion 55 to the side opposite to the container member 47 side. The nozzle 44 has a pipe-like shape. A guiding flow passage 57 is formed inside the nozzle 44. The guiding flow passage 57 is provided in an area that overlaps the area of the opening 54 when the nozzle member 48 is seen in a plan view from the opening 54 side toward the joint portion 55. The guiding flow passage 57 is a hollow area in the nozzle 44, the area overlapping the area of the opening 54 when seen in a plan view. An outflow port 59 is formed at an end 58 of the nozzle 44 on the side opposite to the joint portion 55 side. The outflow port 59 is open toward the side opposite to the joint portion 55 side in the nozzle 44. The outflow port 59 is open at the end 58. Thus, the end 58 surrounds the outflow port 59. The outflow port 59 is located at a terminal of the guiding flow passage 57.

The ink contained in the container member 47 can flow out from the outflow port 59 through the guiding flow passage 57 in the nozzle 44. As a result, the ink in the container member 47 may flow out of the container member 47 from the outflow port 59 through the opening 54 and the guiding flow passage 57. When a user injects the ink in the bottle 41 into the corresponding tank 31, the outflow port 59 is inserted into the ink injection portion 33 of the tank 31. The user then injects the ink in the container member 47 into the tank 31 from the ink injection portion 33. Note that, when the user injects the ink in the bottle 41 into the tank 31, the user removes the lid member 42 (FIG. 6) from the bottle 41 and thereafter performs the injecting operation.

The nozzle 44 includes an engaging portion 61, as shown in FIG. 7. The engaging portion 61 has a tubular appearance, and is located on the joint portion 55 side in the nozzle 44. The engaging portion 61 is formed to have a smaller diameter than that of the joint portion 55. The thread 46 is formed in an outer side portion 61A of the engaging portion 61. The thread 46 is provided so as to project from the side portion 61A. A portion of the nozzle 44 on the side opposite to the joint portion 55 side with respect to the engaging portion 61 is formed to have a smaller diameter than that of the engaging portion 61. Note that, in this example, the guiding flow passage 57 becomes narrower toward the outflow port 59.

Figure 8:
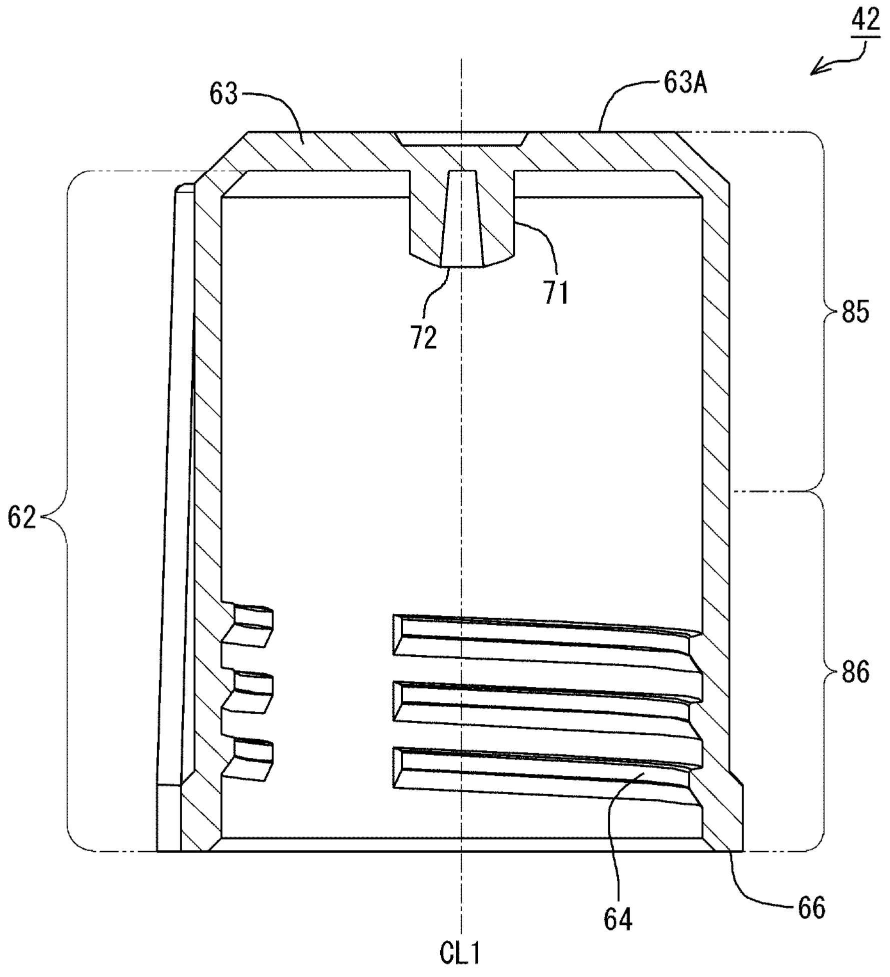
FIG. 8 is a cross-sectional view of a lid member according to an embodiment.

The lid member 42 is made of an elastic material, and may be divided into a tubular barrel 62 and a plate-shaped top plate 63, as shown in FIG. 8, which is a cross-sectional view. Note that FIG. 8 shows a cross-section of the lid member 42 taken along the line A-A in FIG. 6. The material of the lid member 42 may be resin such as polyethylene terephthalate (PET), nylon, polyethylene, polypropylene, or polystyrene, for example. In this example, the lid member 42 is formed by injection molding using a resin material.

The barrel 62 and the top plate 63 are integrally formed. In the bottle set 35, the barrel 62 of the lid member 42 is located on the nozzle member 48 side, as shown in FIG. 6. As shown in FIG. 8, the top plate 63 is located at one end of the barrel 62. In this example, the top plate 63 is located on the side opposite to the nozzle member 48 side of the barrel 62. The tubular barrel 62 projects from the top plate 63 toward the ink container 43 (FIG. 7) side. The top plate 63 closes one end of the tubular barrel 62. That is, the portion that closes the one end of the tubular barrel 62 is the top plate 63. In the example shown in FIG. 8, the top plate 63 is formed in a flat plate shape. However, various plates such as a plate including protrusions and recesses, a corrugated plate, and a plate including a curved surface can be adopted as the top plate 63. Also, the top plate 63 is not limited to having a plate shape, and may have various shapes such as a spherical shape, a columnar shape, and a cone shape. In any of these shapes, the portion that closes the one end of the tubular barrel 62 corresponds to the top plate 63.

A thread 64 is provided in an inner side face of the barrel 62. The barrel 62 is a part to be engaged with the nozzle member 48 (FIG. 7) using the thread 64. The thread 64 is provided at a position of the barrel 62 that is closer to an end 66 than to the top plate 63. The inner diameter of the barrel 62 is configured to be wider than the outer diameter of the engaging portion 61 of the nozzle member 48. The thread 64 is formed on the inside of the barrel 62, and the thread 46 is formed on the outside of the engaging portion 61 of the nozzle member 48. As a result of the thread 64 provided on the inside of the barrel 62 engaging with the thread 46 provided on the outside of the engaging portion 61 of the nozzle member 48, the lid member 42 and the nozzle member 48 can engage with each other. In a state where the lid member 42 and the nozzle member 48 are engaged with each other, the lid member 42 covers the nozzle 44 in the nozzle member 48. That is, the state in which the lid member 42 and the nozzle member 48 are engaged is the covered state. In this example, the portion of the nozzle member 48 on the opposite side from the joint portion 55 side of the thread 46 can be defined as the nozzle 44.

Here, the top plate 63 of the lid member 42 is provided with a plug 71, as shown in FIG. 8. The plug 71 is an example of a sealing portion, and is provided on the nozzle member 48 (FIG. 6) side of the top plate 63, that is, on a side opposite to the top face 63A of the top plate 63. The plug 71 projects from the top plate 63 toward the nozzle member 48 (FIG. 6) side. The plug 71 is provided in a central region of the top plate 63. The plug 71 is provided at a position that faces (opposes) the outflow port 59 of the nozzle 44 when the lid member 42 is attached to the bottle 41.

Figure 9:
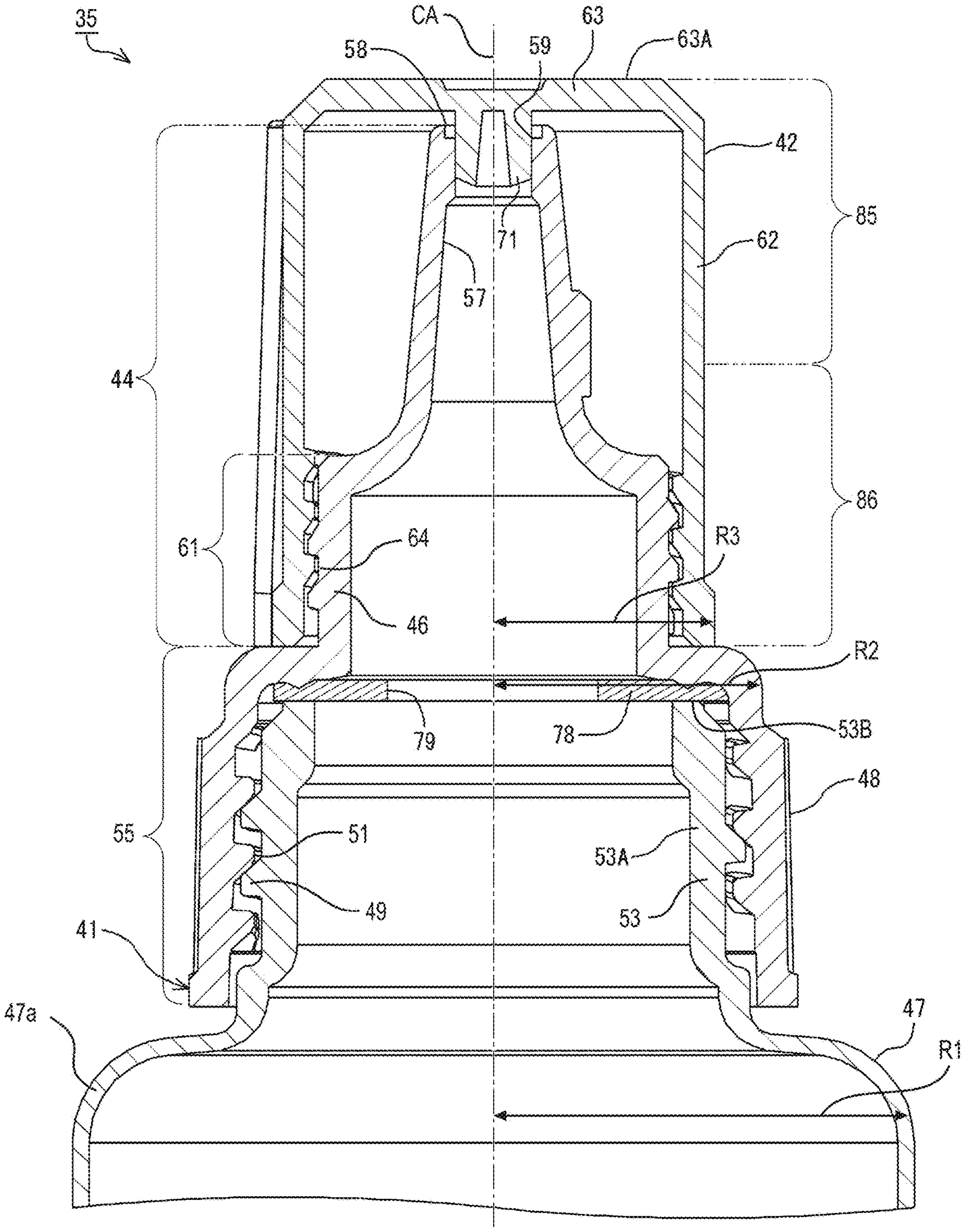
FIG. 9 is a cross-sectional view of the bottle set according to an embodiment.

In the present example, as shown in FIG. 8, the distance (depth) from the end 66 of the barrel 62 to an end 72 of the plug 71 is shorter (shallower) than the distance from an end 77 of the joint portion 55 of the nozzle 44 (FIG. 7) to the end 58 of the nozzle 44. That is, the setting is such that, when the lid member 42 is attached to the bottle 41, the plug 71 enters the inside of the guiding flow passage 57 from the outflow port 59, as shown in FIG. 9. Also, the thickness of the plug 71 is larger than the inner diameter of the outflow port 59.

Accordingly, when the lid member 42 is attached to the bottle 41, the outflow port 59 of the nozzle 44 is closed by the plug 71. Further, as shown in FIG. 9, the barrel 62 has a first radius R1 from a central axis CA, the joint portion 55 has a second radius R2 from the central axis CA, and the second region 86 of the lid member 42C has a third radius R3 from the central axis CA.

With this configuration, the outflow port 59 can be sealed. Thus, in the case where, for example, the ink in the container member 47 cannot be entirely injected into the tank 31 and some ink remains in the container member 47, the ink can be stored in the bottle 41 with the outflow port 59 closed by the lid member 42. This configuration allows the ink to be stored with an increased airtightness in the container member 47 after being opened. As a result, it is possible to suppress evaporation of liquid components of the ink in the bottle 41 and degradation of the ink. In this example, the plug 71 for sealing the outflow port 59 of the nozzle 44 is integrally formed in the lid member 42. Thus, in this bottle set 35, the outflow port 59 in the nozzle 44 can be sealed with the lid member 42. With this configuration, the number of parts can be reduced compared with a configuration in which the outflow port 59 is sealed by adding other members to the lid member 42.

Note that, in the bottle 41, a configuration can be adopted in which a sealing member 78 is interposed between the end 53B of the container member 47 and the nozzle member 48. An opening 79 is formed in the sealing member 78. The ink inside the container member 47 can flow out to the guiding flow passage 57 after passing through the opening 79 of the sealing member 78. According to this configuration, since the sealing member 78 is interposed between the end 53B of the container member 47 and the nozzle member 48, leakage of ink through a gap between the container member 47 and the nozzle member 48 can be suppressed. Note that various materials such as a polyethylene foaming material or an elastic material such as rubber or elastomer can be adopted as the material of the sealing member 78.

In the present embodiment, a part, of the lid member 42, having optical transparency includes a colored portion. The colored portion is colored with a color corresponding to the type of ink contained in the ink container 43 of the bottle 41. That is, at least a portion of the lid member 42 has optical transparency, and includes the colored portion that is colored with a color corresponding to the type of ink contained in the ink container 43. The type of ink can be classified based on the ink components or ink color. The ink can be classified into, when classified by the ink components, resin ink, sublimation ink, water-based ink, oil-based ink, and the like, for example. Water-based ink includes ink having a configuration in which a solute, such as a dye, is dissolved in a water-based solvent, and ink having a configuration in which a dispersoid, such as a pigment, is dispersed in a water-based dispersing medium. Oil-based ink includes ink having a configuration in which a solute, such as a dye, is dissolved in an oil-based solvent, and ink having a configuration in which a dispersoid, such as a pigment, is dispersed in an oil-based dispersing medium.

In the bottle set 35 according to the present embodiment, at least a portion of the lid member 42 has optical transparency, and the part of the lid member 42 having optical transparency includes the colored portion that is colored with a color corresponding to the type of ink contained in the ink container 43. According to this configuration, as a result of providing a portion that is colored with a color corresponding to the type of ink, the lid member 42 can be easily identified with respect to the type of ink. Therefore, attention can be brought to operation of the lid member 42 when attaching/detaching the lid member 42 to/from the bottle 41, or the like. Accordingly, the lid member 42 can be prevented from being attached to the wrong bottle 41 of a different type of ink, for example.

The ink can be classified into, when classified by the ink color, yellow, magenta, cyan, black, and the like, for example. In the example in which the ink is classified by the color of the ink contained in the ink container 43, as a result of proving a lid member 42 having a portion that is colored with a color that is different depending on the color of ink, the lid member 42 can be easily identified with respect to the color of ink. Therefore, attention can be brought to operation of the lid member 42 when attaching/detaching the lid member 42 to/from the bottle 41, or the like. Accordingly, if the lid member 42 has a portion that is colored with a color similar to the ink color, the lid member 42 can be prevented from being attached to a wrong bottle 41 of a different type of ink, for example.

In the lid member 42, the colored portion may be a portion of or all of the part, of the lid member 42, having optical transparency. Also, in one lid member 42, a configuration in which there is one colored portion and a configuration in which colored portions are arranged at a plurality of locations can be adopted. Furthermore, in the configuration in which the colored portions are arranged at a plurality of locations, a configuration in which all colored portions are colored with the same color or a configuration in which the colored portions at different locations are colored with different colors can be adopted. Hereinafter, various examples of the lid member 42 will be described. Note that in order to identify the lid member 42 in the respective examples below, different alphabetical letters, signs, and the like are appended to reference signs for the lid member 42 in each example.

Figure 10:
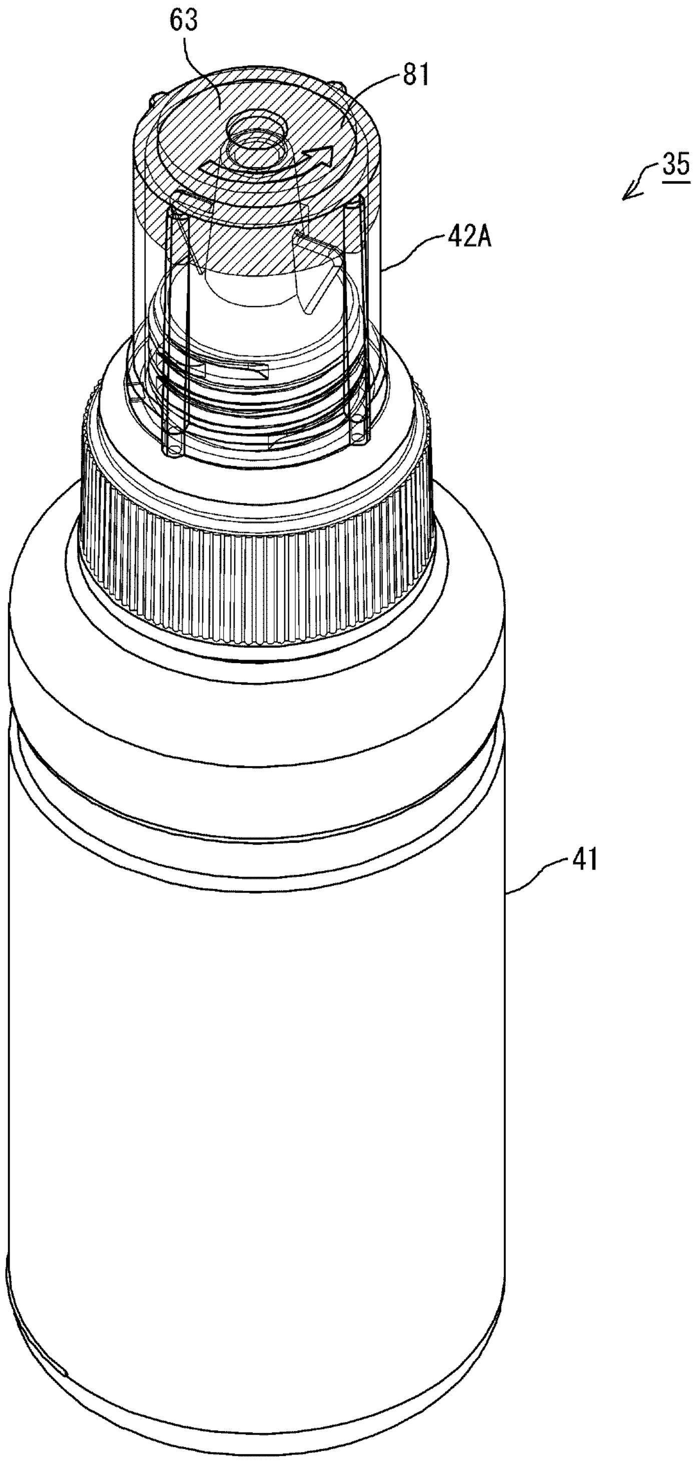
FIG. 10 is a perspective view of a bottle set in Example 1.

A lid member 42A of Example 1 will be described. In Example 1, the entirety of the lid member 42A has optical transparency. Also, the lid member 42A has a colored portion 81 as shown in FIG. 10. The colored portion 81 is provided in a portion of the lid member 42A. That is, the colored portion 81 is provided in a portion of the part, of the lid member 42A, that has optical transparency. Any position can be adopted as the position of the colored portion 81 in the lid member 42A. That is, the colored portion 81 can be located at any position of a portion, of the lid member 42A, having optical transparency. Note that, in the lid member 42A, the colored portion 81 has optical transparency. Note that, in FIG. 10, the colored portion 81 is hatched in order to facilitate understanding of the configuration.

In Example 1, the colored portion 81 of the lid member 42A is colored with a color similar to the color of ink contained in the ink container 43 of the bottle 41. In a bottle set 35 in which the lid member 42A of Example 1 is adopted, as a result of providing the lid member 42A having the colored portion 81 colored with a color similar to the color of ink, the lid member 42A can be prevented from being attached to a wrong bottle set 35 containing ink of different color.

For example, in a bottle set 35 containing yellow ink, the colored portion 81 of the lid member 42A is colored with a color similar to yellow. Also, in a bottle set 35 containing magenta ink, the colored portion 81 of the lid member 42A is colored with a color similar to magenta. Also, in a bottle set 35 containing cyan ink, the colored portion 81 of the lid member 42A is colored with a color similar to cyan. Also, in a bottle set 35 containing black ink, the colored portion 81 of the lid member 42A is colored with a color similar to black.

Here, the colors yellow, magenta, and cyan are defined. Here, colors are defined based on the chromaticity diagram of the Lab color system. In the chromaticity diagram of the Lab color system, the red direction is defined as 0 degrees, and the angle in the counterclockwise direction (positive direction) is a hue angle. According to the chromaticity diagram of the Lab color system, any color can be specified by the hue angle in a range from 0 degrees to 360 degrees.

The color in a range of 92±30 degrees in hue angle is defined as yellow. The color in a range of 234±30 degrees in hue angle is defined as cyan. The color in a range of 349±30 degrees in hue angle is defined as magenta. Note that 360 degrees in hue angle is equivalent to 0 degrees in hue angle. Therefore, 379 degrees in hue angle in the range of magenta is equivalent to 19 degrees in hue angle. Also, each color range includes a color in a hue angle obtained by adding 30 degrees to the specified value, and a color in a hue angle obtained by subtracting 30 degrees from the specified value. Therefore, the color of 62 degrees in hue angle and the color of 122 degrees in hue angle are yellow. The same applies to the colors of cyan and magenta. The color in a range of 92±30 degrees in hue angle is also expressed as a color similar to yellow. The color in a range of 234±30 degrees in hue angle is also expressed as a color similar to cyan. The color in a range of 349±30 degrees in hue angle is also expressed as a color similar to magenta.

In the present embodiment, the color of ink is determined based on a result of printing on a recording medium P using the ink. Specifically, the color of ink is determined based on a result of measuring an image rendered on the recording medium P using ink with a colorimeter. Accordingly, the color in a range of 92±30 degrees in hue angle, as a result of measurement with the colorimeter, is yellow of the ink. Similarly, the color in a range of 234±30 degrees in hue angle, as a result of measurement with the colorimeter, is cyan of the ink. The color in a range of 349±30 degrees in hue angle, as a result of measurement with the colorimeter, is magenta of the ink.

Note that photographic paper (glossy) manufactured by Seiko Epson corporation is adopted as the recording medium P in the above measurement. Also, the printing conditions are as follows. The resolution along the X axis is 720 dpi (the number of dots per inch), and the resolution along the Y axis is 720 dpi. The print duty (area ratio of dots, that is, area occupied by dots in a unit area) is 50%. A spectrophotometer (MCPD-9800) manufactured by Otsuka Electronics Co., Ltd. is adopted as the colorimeter. Measurement using a D-50 as a light source and at a two degree viewing angle are adopted as the measurement conditions.

Also, in the present embodiment, the color of the colored portion 81 of the lid member 42A is determined based on the result of measuring the colored portion 81 with the colorimeter. Based on this, the color in a range of 92±30 degrees in hue angle, as a result of measurement on the colored portion 81 with the colorimeter, is yellow of the colored portion 81. Similarly, the color in a range of 234±30 degrees in hue angle, as a result of measurement on the colored portion 81 with the colorimeter, is cyan of the colored portion 81. The color in a range of 349±30 degrees in hue angle, as a result of measurement on the colored portion 81 with the colorimeter, is magenta of the colored portion 81. The measuring instrument and the measurement conditions are similar to those in the measurement of color of ink. That is, a spectrophotometer (i1io) manufactured by X-Rite Inc. Measurement using a D-50 as a light source and at a two degree viewing angle are adopted as the measurement conditions.

In the lid member 42A, the colored portion 81 is located on the top plate 63 side of the lid member 42A. The region on the top plate 63 side of the lid member 42A includes the top plate 63 shown in FIG. 8, and is a region from the top plate 63 to a position on the top plate 63 side of the barrel 62 relative to the end 66 opposite to the top plate 63. In the present example, the top plate 63 is included in the colored portion 81.

In the bottle set 35 of Example 1, the colored portion 81 colored with a color similar to the color of ink is arranged on the top plate 63 side of the lid member 42A. According to this configuration, a part, of the nozzle 44 shown in FIG. 9, near the outflow port 59 to which ink is likely to adhere can be easily covered by the colored portion 81 colored with a color similar to the ink. Accordingly, the lid member 42A colored with the color similar to a predetermined color can be attached to a bottle containing ink of the predetermined color, and the lid member 42A can be prevented from being mistakenly attached. Also, the ink adhered to a part near the outflow port 59 of the nozzle 44 becomes inconspicuous.

Note that, in the present embodiment, the colored portion 81 (arranged on the top plate 63 side of the lid member 42A) is colored with a color similar to the color of ink, but the colored portion 81 may be colored with a color opposite to the color of ink.

EXAMPLE 2

Figure 11:
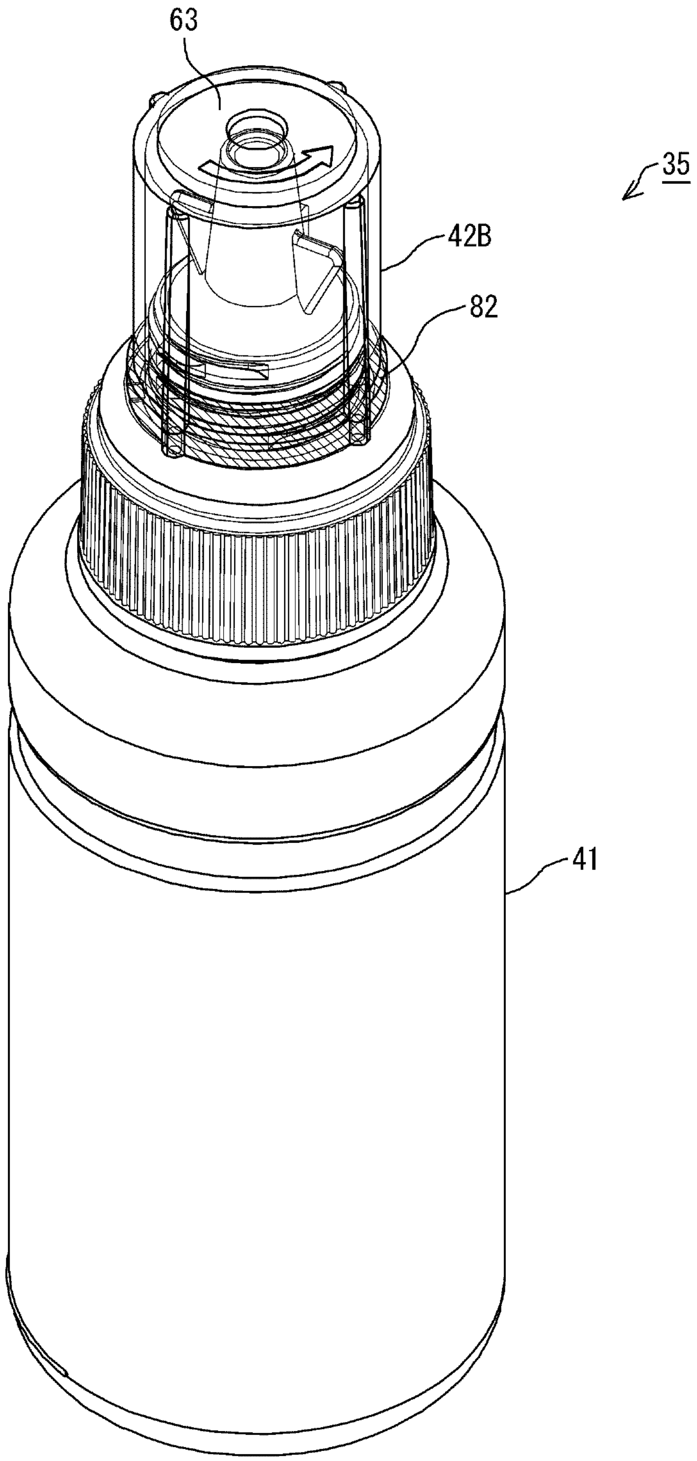
FIG. 11 is a perspective view of a bottle set in Example 2.

A lid member 42B of Example 2 will be described. Constituent parts in Example 2 that are the same as those in Example 1 will be assigned the same signs as those in Example 1, and a detailed description thereof will be omitted. In Example 2, the entirety of a lid member 42B has optical transparency. The lid member 42B has a colored portion 82 as shown in FIG. 11. The colored portion 82 is provided in a portion of the lid member 42B. That is, the colored portion 82 is provided in a portion of the part, of the lid member 42B, that has optical transparency. Any position can be adopted as the position of the colored portion 82 in the lid member 42B. That is, the colored portion 82 can be located at any position in the portion, of the lid member 42B, having optical transparency. Note that, in the lid member 42B, the colored portion 82 has optical transparency. Note that, in FIG. 11, the colored portion 82 is hatched in order to facilitate understanding of the configuration.

In Example 2, the colored portion 82 of the lid member 42B is colored with a color opposite to the color of the ink contained in the ink container 43 of the bottle 41. The color opposite to the color of ink is a color in a hue angle obtained by adding 180 degrees to the hue angle of the color of the ink. For example, the color opposite to yellow is a color in a range of 272±30 degrees in hue angle.

Also, the color opposite to cyan is a color in a range of 414±30 degrees (54±30 degrees) in hue angle. The color opposite to magenta is a color in a range of 529±30 degrees (169±30 degrees) in hue angle. Here, the color of ink and the color of the colored portion 82 are determined based on the result of measurement with the colorimeter, similarly to Example 1. Also, the measurement method, the measurement conditions, and measurement with the colorimeter regarding the color of the ink and the color of the colored portion 82 are similar to those in Example 1.

In the bottle set 35 in which the lid member 42B of Example 2 is adopted, ink that has adhered to the lid member 42B can be easily recognized as a result of providing the lid member 42B having the colored portion 82 colored with a color opposite to the color of the ink, for example. Therefore, a worker can easily notice that ink has adhered to the lid member 42B. Accordingly, attention can be brought to the scattering of ink adhered to the lid member 42B when attaching/detaching the lid member 42B to/from the bottle 41, or the like.

In the lid member 42B, the colored portion 82 is arranged on a side of the lid member 42B opposite to the top plate 63 side. The region on the side of the lid member 42B opposite to the top plate 63 side is a region from the end 66 of the barrel 62 on the side opposite to the top plate 63 side to a position between the top plate 63 and the end 66.

In the bottle set 35 of Example 2, the colored portion 82 colored with a color opposite to the color of ink is arranged on the side of the lid member 42B opposite to the top plate 63. According to this configuration, attention can be called to the situation in which, when the ink adhered to the lid member 42B is located on the end 66 side of the barrel 62 shown in FIG. 9, the ink is likely to drip from the lid member 42B. Note that, in the present embodiment, the colored portion 82 (arranged on the side of the lid member 42B opposite to the top plate 63 side) is colored with a color opposite to the color of the ink, but the colored portion 81 may be colored with a color similar to the color of ink.

EXAMPLE 3

Figure 12:
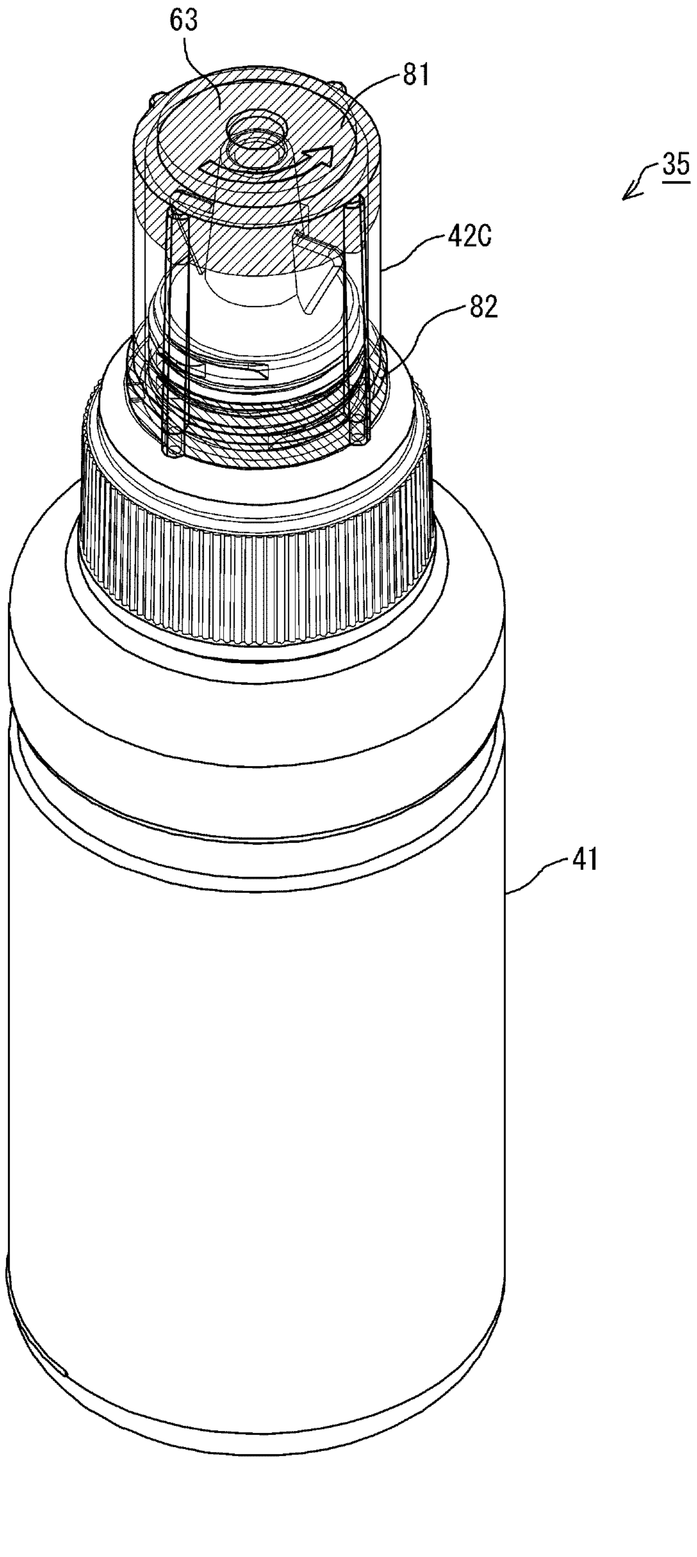
FIG. 12 is a perspective view of a bottle set in Example 3.

A lid member 42C of Example 3 will be described. Constituent parts in Example 3 that are the same as those in Examples 1 and 2 will be assigned the same signs as those in Examples 1 and 2, and a detailed description thereof is omitted. In Example 3, the entirety of a lid member 42C has optical transparency. The lid member 42C includes a colored portion 81 and a colored portion 82, as shown in FIG. 12. The colored portion 81 and the colored portion 82 are each provided in a portion of the lid member 42C. That is, the colored portion 81 and the colored portion 82 are each provided in a portion of the part, of the lid member 42C, that has optical transparency. Note that, in the present embodiment, the colored portion 81 and the colored portion 82 respectively correspond to a first colored portion and a second colored portion of the invention.

The colored portion 81 is colored with a color similar to the color of the ink contained in the ink container 43 of the bottle 41, similarly to Example 1. Also, the colored portion 82 is colored with a color opposite to the color of the ink contained in the ink container 43 of the bottle 41, similarly to Example 2. The color of the ink and the color of the colored portion 81 and the colored portion 82 are determined based on the result of measurement with the colorimeter, similarly to Examples 1 and 2. Also, the measurement method, the measurement conditions, and measurement with the colorimeter regarding the color of ink and the color of the colored portion 81 and the colored portion 82 are similar to those in Examples 1 and 2.

The colored portion 81 and the colored portion 82 can be arranged in the lid member 42C at any regions as long as the regions have optical transparency and are located at positions separated from each other. Note that, in FIG. 12, the colored portion 81 and the colored portion 82 are hatched in order to facilitate understanding of the configuration.

In the lid member 42C, the colored portion 81 is arranged in a first region 85 shown in FIG. 8. Also, the colored portion 82 is arranged in a second region 86 shown in FIG. 8. In the lid member 42C, the first region 85 and the second region 86 are regions that are different from each other. In the lid member 42C, the first region 85 and the second region 86 do not overlap each other. In the lid member 42C, the first region 85 is located on the top plate 63 side. In the lid member 42C, the second region 86 is located on the end 66 side of the barrel 62 relative to the first region 85.

In other words, the first region 85 includes the top plate 63 and is a region from the top plate 63 to a position on the top plate 63 side relative to the end 66 on the side opposite to the top plate 63 side of the barrel 62. Also, the second region 86 is located on the end 66 side of the barrel 62 relative to the first region 85, and is a region from the end 66 on the side opposite to the top plate 63 side of the barrel 62 to a position that is located between the top plate 63 and the end 66.

Note that, in the example shown in FIG. 8, the lid member 42 (lid member 42C) is divided into two regions, namely the first region 85 and the second region 86. However, the division of regions in the lid member 42C is not limited to two regions, namely the first region 85 and the second region 86, and three regions or regions of more than three regions may be adopted. For example, in the case where the lid member 42C is divided into three regions, a third region is arranged between the first region 85 and the second region 86. Also, in the example shown in FIG. 8, the first region 85 and the second region 86 are contiguous to each other. However, a configuration in which the first region 85 and the second region 86 are separated from each other can be adopted.

According to the above configuration, in the lid member 42C, the colored portion 81 is arranged on the top plate 63 side of the lid member 42C. In the present example, the top plate 63 is included in the colored portion 81. Also, the colored portion 82 is arranged on the side opposite to the top plate 63 side of the lid member 42C, that is, on the end 66 side of the lid member 42C.

In the bottle set 35 of Example 3, the colored portion 81 colored with a color similar to the color of the ink is arranged in the first region 85 of the lid member 42C on the top plate 63 side, and the colored portion 82 colored with a color opposite to the color of the ink is arranged in the second region 86 of the lid member 42C on the end 66 side relative to the first region 85. Accordingly, the first region 85 of the lid member 42C can be made closer to the outflow port 59 (to which ink is likely to adhere) of the nozzle 44. Also, the second region 86 of the lid member 42C can be made closer to the joint portion 55 of the nozzle 44. Therefore, as a result of providing the colored portion 81 colored with a color similar to the color of the ink, the ink adhered to a portion near the outflow port 59 of the nozzle 44 becomes inconspicuous. Also, as a result of providing the colored portion 82 colored with a color opposite to the color of the ink, the ink adhered to a portion of the barrel 62 on the end 66 side can be easily recognized, for example. Accordingly, attention can be brought to a situation in which the ink is likely to drip from the lid member 42C.

Figure 13:
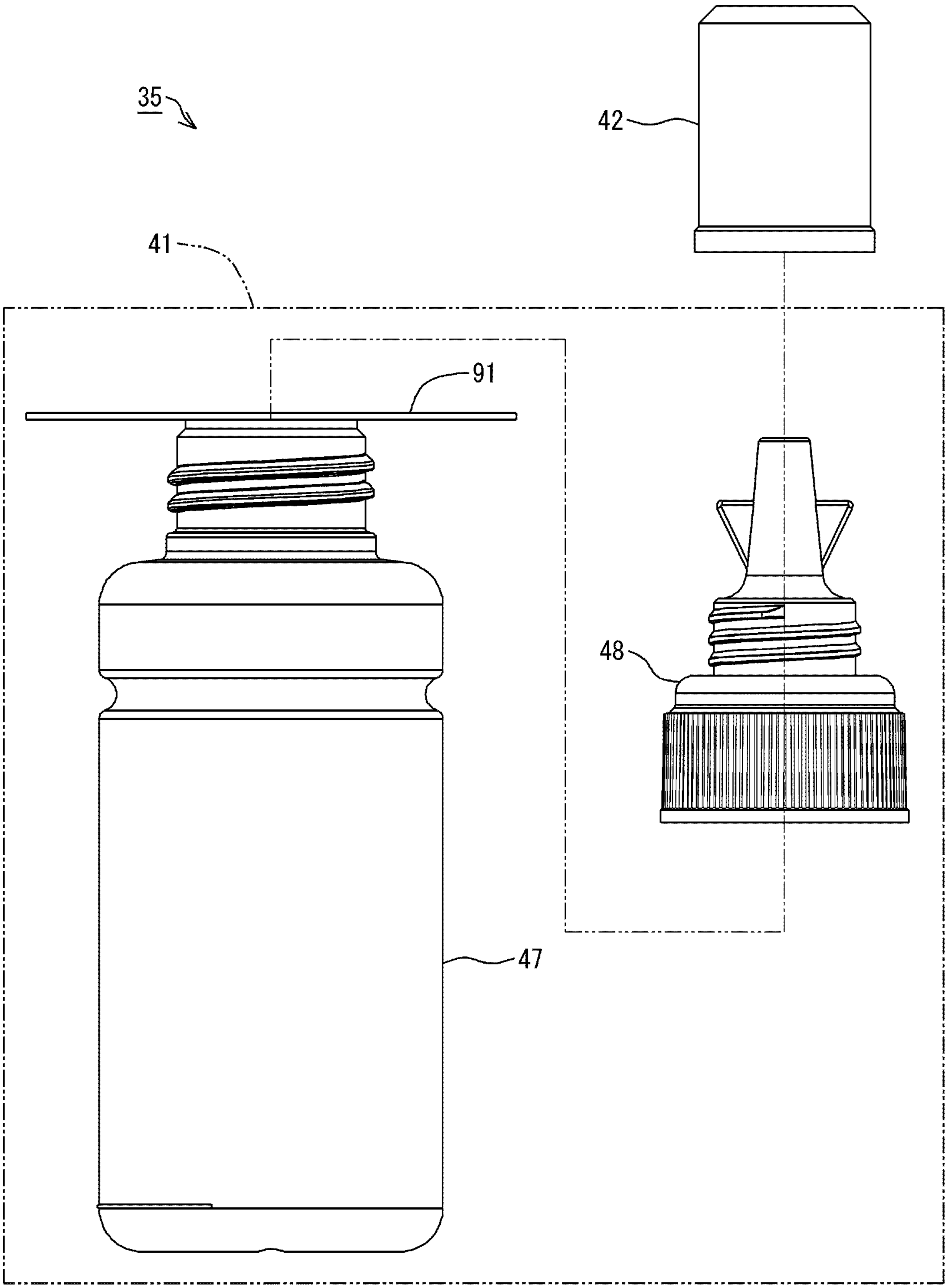
FIG. 13 is an exploded view showing another example of a bottle set according to an embodiment.

A configuration can be adopted in which a film 91 is added to the container member 47 in the bottle 41 of the bottle set 35 in the embodiments and examples described above, as shown in FIG. 13. Note that, here, the bottle set described in the embodiments and examples described above is used in the description of the configuration of the bottle 41 to which the film 91 is added for the sake of convenience of description, but the lid member 42 need not to be colored, and may be a (uncolored) transparent lid member or the like. The film 91 has a size and shape that allows the opening 54 of the container member 47 (FIG. 7) to be covered. The film 91 is joined to the end 53B of the opening 54 (FIG. 7). The film 91 is joined to the end 53B by means of adhesion, for example. Thus, a high liquid-tightness is kept in the container member 47, and the ink can be stored in an airtight manner in the container member 47. The user who uses the bottle set 35 removes the film 91 from the container member 47 before injecting the ink in the bottle set 35 into the tank 31, and thereafter injects the ink. The material of the film 91 may be polyethylene terephthalate (PET), nylon, polyethylene, or the like, for example. A laminated structure in which those materials are laminated may also be employed. Furthermore, a configuration that includes a layer of any of those materials to which aluminum or the like is evaporated may also be employed. Thus, higher gas barrier properties can be achieved.

Figure 14:
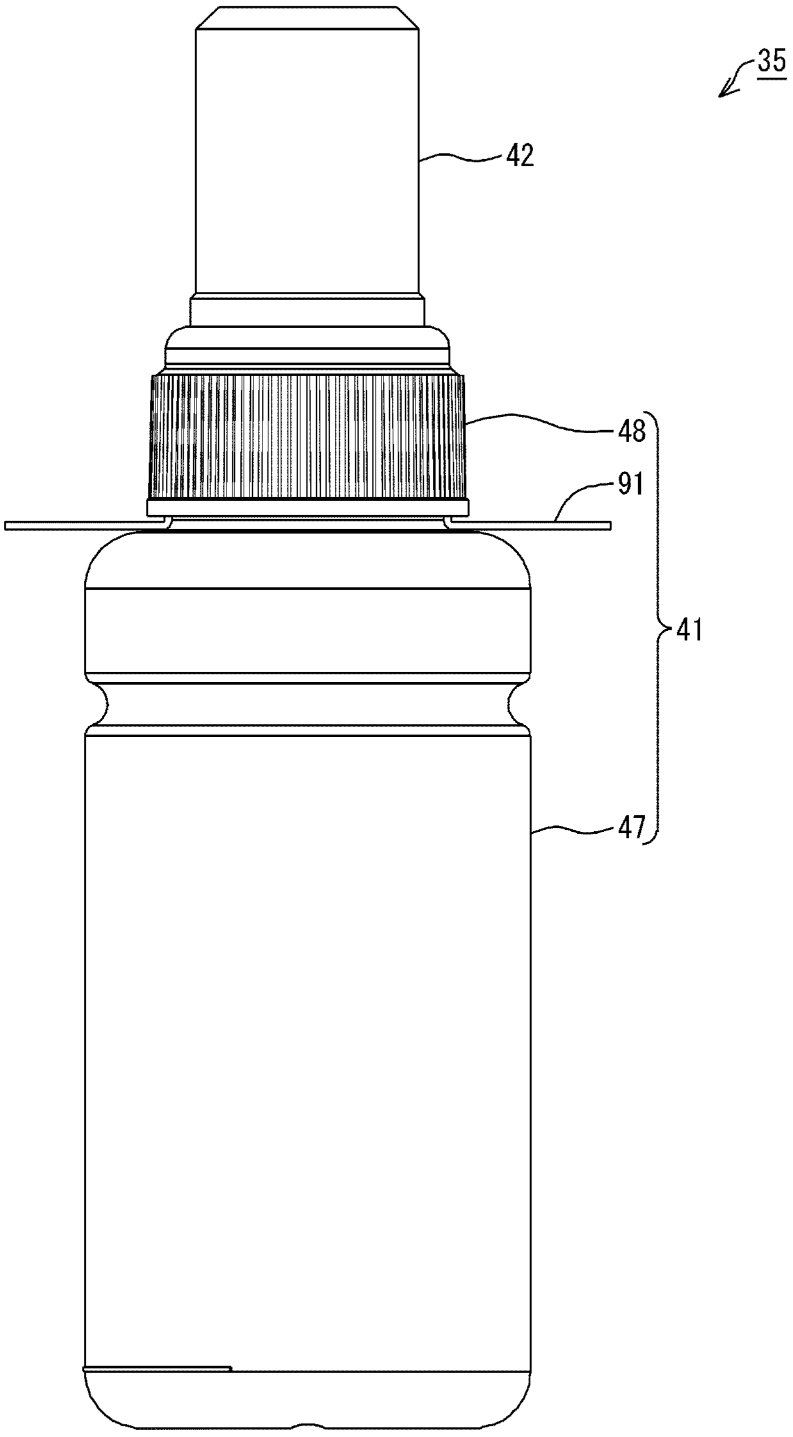
FIG. 14 is an external view showing another example of a bottle set according to an embodiment.

With the bottle set 35 having the film 91, the film 91 can be set to stick out from the nozzle member 48 in a state of the nozzle member 48 being attached to the container member 47, as shown in FIG. 14. That is, the bottle 41 of the bottle set 35 having this configuration includes the container member 47 in which the opening 54 that is in communication with the inside of the ink container 43 is formed, the nozzle member 48 in which the outflow port 59 that is in communication with the opening 54 is formed and that is attached to the container member 47 in a manner of being attachable to and detachable from the container member 47, and a film 91 that seals the opening 54 by covering the opening 54 of the container member 47 and that extends outside the nozzle member 48 in a state in which the nozzle member 48 is attached to the container member 47.

According to this configuration, since the film 91 sticks out from the nozzle member 48, the user can easily notice the film 91. That is, in the bottle set 35, since the film 91 that seals the opening 54 extends outside the nozzle member 48, the user can easily notice the presence of the film 91. Therefore, the user is prompted to peel off the film 91 from the container member 47 in the bottle.

If the user does not notice the presence of the film 91, the user tries to inject the ink in the bottle set 35 into the tank 31 but cannot do so, which is inconvenient. This situation degrades the convenience. In contrast, if the film 91 is set to stick out from the nozzle member 48, the user can easily notice the film 91. Thus, the user is likely to remove the film 91 from the container member 47 before injecting the ink in the bottle set 35 into the tank 31. As a result, it is possible to prompt the user to perform an operation to remove the film 91 from the container member 47 before injecting the ink into the tank 31. Thus, the convenience of the bottle set 35 can be improved.

In addition, if the film 91 is set to stick out from the nozzle member 48, the user can readily hold the film 91. Thus, the film 91 is likely to be removed from the container member 47, which further improves the convenience of the bottle set 35. Also, although an illustration is omitted in the present embodiment, a label for indicating information can be added to a portion of the film 91 that sticks out from the nozzle member 48. The label may include information regarding the ink, such as ink color and main components thereof, and cautions regarding the handling, for example. Furthermore, color that indicates the ink color may also be added as the information regarding the ink. Since the user can be easily notified of the information, the label added to the film 91 can further improve the convenience of the bottle set 35. Addition of the label to the film 91 allows the user to more easily notice the film 91. As a result, the convenience of the bottle set 35 can be further improved.

In the above embodiment and examples, the ink ejection apparatus may be a liquid ejection apparatus that ejects, discharges, or applies liquid other than ink to consume the liquid. Note that the status of liquid discharged as very small droplets from the liquid ejection apparatus includes a granular shape, a tear-drop shape, and a shape having a thread-like trailing end. Furthermore, the liquid mentioned here may be any kind of material that can be consumed by the liquid ejection apparatus. For example, the liquid need only be a material whose substance is in the liquid phase, and includes fluids such as inorganic solvent, organic solvent, solution, liquid resin, and liquid metal (metal melt) in the form of a liquid body having a high or low viscosity, sol, gel water, or the like. Furthermore, the liquid is not limited to being a one-state substance, and also includes particles of a functional material made from solid matter, such as pigment or metal particles, that are dissolved, dispersed, or mixed in a solvent. Representative examples of the liquid include ink such as that described in the above embodiment, as well as liquid crystal, and the like. Here, “ink” encompasses general water-based ink and oil-based ink, as well as various types of liquid compositions such as gel ink and hot melt-ink. Specific examples of the liquid ejection apparatus include liquid ejection apparatuses that eject a liquid containing, in the form of dispersion or dissolution, a material such as an electrode material or a color material used in manufacturing or the like of a liquid crystal display, an EL (electroluminescence) display, a surface-emitting display, or a color filter, for example. The liquid ejection apparatus may also be a liquid ejection apparatus that ejects biological organic matter used in manufacturing of a biochip, a liquid ejection apparatus that is used as a precision pipette and ejects a liquid serving as a sample, a textile printing apparatus, a microdispenser, or the like. Furthermore, the liquid ejection apparatus may also be a liquid ejection apparatus that ejects lubricating oil in a pinpoint manner to a precision machine such as a watch or a camera, or a liquid ejection apparatus that ejects a transparent resin liquid such as ultraviolet-cured resin onto a substrate in order to form a micro-hemispherical lens (optical lens) or the like that is used in an optical communication device or the like. Furthermore, the liquid ejection apparatus may be a liquid ejection apparatus that ejects an etchant which is acid, alkaline, or the like, in order to etch a substrate or the like.

Note that the invention is not limited to the above embodiment and examples, and can be achieved by various configurations without departing from the gist thereof. For example, the technical features in the embodiment and examples that correspond to the technical features in the modes described in the summary of the invention may be replaced or combined as appropriate in order to solve part or the entire foregoing problem, or to achieve some or all of the above-described effects. The technical features that are not described as essential in the specification can be deleted as appropriate. In the above embodiments, the bottle is made of material having elasticity, but the entirety or a portion of the bottle may be formed by another material such as glass or ceramic.

What is claimed is:

1. An ink bottle set comprising an ink bottle configured to contain ink and a lid member configured to be detachably attached to the ink bottle, the ink bottle comprising:

a container member that includes a barrel that has a cylindrical side wall, and a first engaging portion having a container member thread in an outer side of the first engaging portion; and a nozzle member that includes a nozzle with an outflow port, a joint portion having a nozzle member inner side thread in an inner side of the joint portion, the joint portion engageable with the first engaging portion of the container member via the nozzle member inner side thread and the container member thread, and a second engaging portion having a nozzle member outer side thread in an outer side of the second engaging portion, the lid member having a first region and a second region, the second region having a lid member inner side thread in an inner side face of the second region, the lid member engageable with the nozzle member via the lid member inner side thread and the nozzle member outer side thread, wherein the ink bottle set has a central axis in an engagement state in which the second region of the lid member is engaged with the second engaging portion of the nozzle member and the joint portion of the nozzle member is engaged with the first engaging portion of the container member, the second region of the lid member is adjoined with the joint portion of the nozzle member along the central axis in the engagement state, and wherein at least a portion of the second region of the lid member is distinguishable in appearance from the joint portion of the nozzle member in the engagement state.

2. The ink bottle set according to claim 1, wherein at least the second region of the lid member is distinguishable in color from the joint portion of the nozzle member in the engagement state.

3. The ink bottle set according to claim 1, wherein at least the second region of the lid member is distinguishable in optical transparency from the joint portion of the nozzle member in the engagement state.

4. The ink bottle set according to claim 1, wherein the barrel of the container member has a first radius from the central axis, the joint portion of the nozzle member has a second radius from the central axis, the second region of the lid member has a third radius from the central axis, and wherein a difference between the second radius and the third radius is less than a difference between the second radius and the first radius in the engagement state.

5. The ink bottle set according to claim 1, wherein a sealing member is interposed between an end of the container member and the nozzle member.

6. The ink bottle set according to claim 1, wherein the container member has an end with an opening, and wherein a film is joined to the end before an initial use of the ink bottle and the film has a size and shape that allows the opening to be covered.

7. The ink bottle set according to claim 6, wherein the film is set to stick out from the nozzle member.

* * * * *